US007413512B2

(12) United States Patent
Mattice et al.

(10) Patent No.: US 7,413,512 B2
(45) Date of Patent: Aug. 19, 2008

(54) DISPLAY PANEL FOR A GAMING APPARATUS

(75) Inventors: Harold E. Mattice, Gardnerville, NV (US); Chauncey W. Griswold, Reno, NV (US); Richard L. Wilder, Sparks, NV (US); Christian E. Gadda, Las Vegas, NV (US)

(73) Assignee: IGT, Reno, NV (US)

( * ) Notice: Subject to any disclaimer, the term of this patent is extended or adjusted under 35 U.S.C. 154(b) by 857 days.

(21) Appl. No.: 10/662,566

(22) Filed: Sep. 15, 2003

(65) Prior Publication Data

US 2005/0060051 A1 Mar. 17, 2005

(51) Int. Cl.
*A63F 13/00* (2006.01)

(52) U.S. Cl. ............................ 463/31; 463/30; 463/32; 273/138.1; 273/139

(58) Field of Classification Search ............ 463/30-34, 463/1, 16, 17, 46-47; 273/138.1, 139, 142 R
See application file for complete search history.

(56) References Cited

U.S. PATENT DOCUMENTS 4,618,150 A 10/1986 Kimura ...................... 273/143
6,027,115 A 2/2000 Griswold et al. ........ 273/143 R
6,106,393 A 8/2000 Sunaga et al. ................. 463/20
6,110,040 A * 8/2000 Sanduski et al. .............. 463/13
6,135,884 A 10/2000 Hedrick et al. ................ 463/20
6,270,412 B1 * 8/2001 Crawford et al. .............. 463/20
6,368,216 B1 4/2002 Hedrick et al. ................ 463/20
2001/0034259 A1 10/2001 Luciano et al. ............... 463/16
2003/0017865 A1 1/2003 Beaulieu et al. ............... 463/16
2003/0060269 A1 3/2003 Paulsen et al. ................ 463/20
2003/0064784 A1 4/2003 Wells et al. .................. 463/20
2003/0109304 A1 * 6/2003 Gauselmann ................ 463/30

(Continued)

FOREIGN PATENT DOCUMENTS

DE 31 05 266 9/1982

(Continued)

OTHER PUBLICATIONS

International Search Report completed for PCT/US2004/028462 on Feb. 3, 2005.

*Primary Examiner*—Robert E Pezuto
*Assistant Examiner*—Robert Mosser
(74) *Attorney, Agent, or Firm*—Weaver Austin Villeneuve & Sampson LLP

(57) ABSTRACT

A gaming apparatus may include a housing, a display unit, a value input device, a controller operatively coupled to the display unit and the value input device. The housing may include a first opening, a second opening and one or more light sources positioned around the second opening. The controller may be operatively coupled to the light sources. The display unit may be positioned relative to the housing so that a first portion of the display unit is visible through the first opening and the second portion of the display unit is visible through the second opening. The controller may comprise a processor and a memory, and may be programmed to cause the display unit to generate a first display on the first portion of the display unit, to cause the display unit to generate a second display on the second portion of the display unit, to cause the light sources to emit light when the second display is generated, and to determine a value payout associated with an outcome of the game.

36 Claims, 19 Drawing Sheets

FOREIGN PATENT DOCUMENTS

| | | |
|---|---|---|
| DE | 296 09 573 | 9/1996 |
| DE | 196 13 422 | 9/1997 |
| EP | 0 410 789 | 1/1991 |
| EP | 0 887 775 | 12/1998 |
| EP | 1 408 463 | 4/2004 |
| WO | 01/12281 | 2/2001 |
| WO | 03/010726 | 2/2003 |
| WO | 03/028829 | 4/2003 |

* cited by examiner

FIG. 10
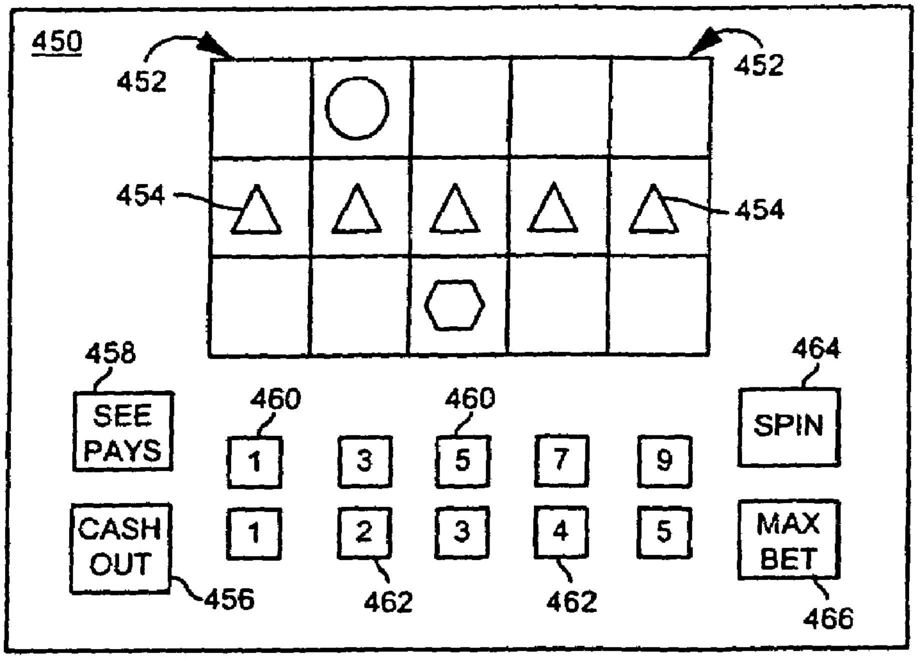
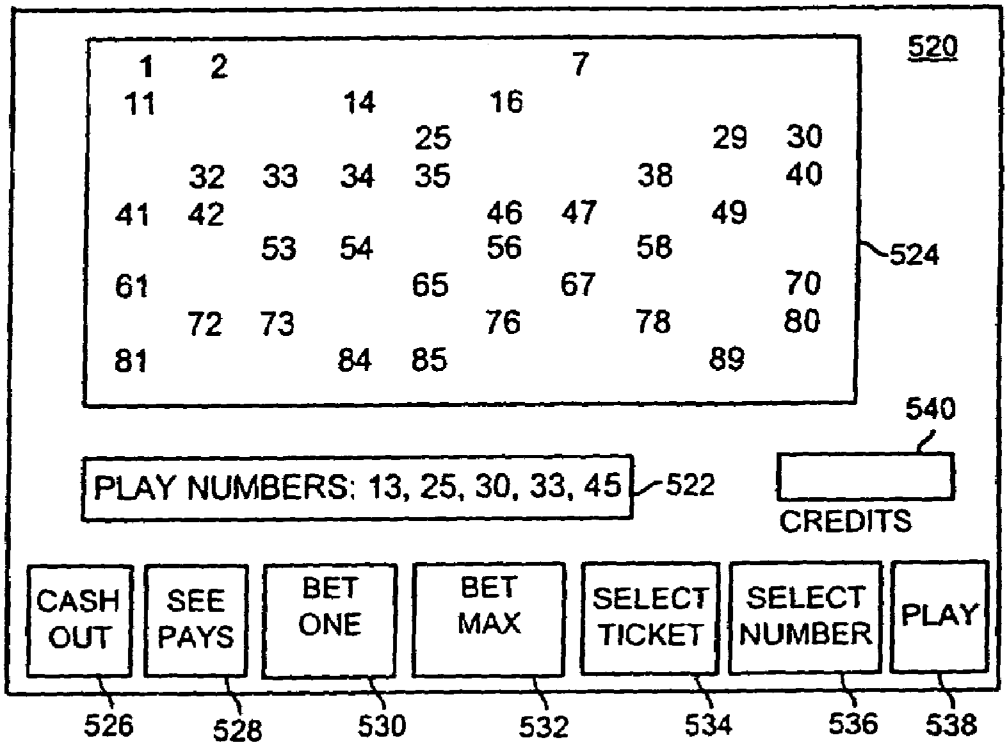
FIG. 11

DISPLAY PANEL FOR A GAMING APPARATUS

BACKGROUND

This patent is directed to a casino gaming apparatus, which could be either an individual gaming unit or a casino gaming system having a plurality of gaming units, each gaming unit including multiple display panels made up of a single, subdivided display.

Conventional casino gaming units often included multiple display panels for displaying a variety of images. The gaming unit consisted of three separate display panels: the top glass, the bottom (or "belly") glass, and the primary display. The top glass and the belly glass were typically static images that provided game instructions, game information, images to attract players to the game, or images otherwise associated with the games that could be played on the gaming unit, though active images were sometimes used. The top glass sometimes used active images to display a bonus game. The top glass was typically part of a top box that could be removed from the remainder of the gaming unit. To change the bonus game, the entire top box had to be removed. The displays have included active images that may vary as part of a player-attract sequence or as part of the game play. Sometimes the game play would require the player's attention on a different display or area of a display, though this was difficult to communicate to the player which, in turn, limited player interaction. A front panel was part of the game unit housing and included a control panel. The front panel was sometimes designed to correspond to the game or bonus game of the gaming unit. In some cases, the top box was designed to correspond to a bonus game displayed on the top glass.

SUMMARY OF THE INVENTION

In one aspect, the invention is directed to a gaming apparatus that may include a housing, a display unit, a value input device and a controller. The housing may include a first opening, a second opening, and one or more light sources positioned around the second opening. The display unit may be positioned relative to the housing so that a first portion of the display unit is visible through the first opening and a second portion of the display unit is visible through the second opening. The controller may be operatively coupled to the display unit, the value input device and the light sources around the second opening. The controller may include a processor and a memory operatively coupled to the processor. The controller may be programmed to cause the display unit to generate a first display relating to one of the following games: poker, blackjack, slots, keno or bingo. The controller may also be programmed to cause the display unit to generate a second display on the second portion of the display unit, to cause the light sources around the second opening to emit light when the second display is generated, and to determine a value payout associated with an outcome of the game.

In another aspect, the invention is directed to a gaming apparatus that may include a housing, a first display unit, a second display unit, a value input device and a controller. The housing may include a first opening, a second opening, and one or more light sources positioned around the first opening. The second display unit may be positioned relative to the housing so that a first portion of the second display unit is visible through the first opening and so that a second portion of the second display unit is visible through the second opening. The controller may be operatively coupled to the first and second display units, the value input device, and the light sources around the first opening. The controller may include a processor and a memory operatively coupled to the processor. The controller may be programmed to cause the first display unit to generate a first display relating to one of the following games: poker, blackjack, slots, keno or bingo. The controller may also be programmed to cause the second display unit to generate a second display on the first portion of the second display unit, to cause the second display unit to generate a third display on the second portion of the second display unit, to cause the light sources around the first opening to emit light when the second display is generated on the first portion of the second display unit, and to determine a value payout associated with an outcome of the game.

In a further aspect, the invention is directed to a gaming apparatus that may include a housing, a display unit, a value input device and a controller. The housing may include an opening, one or more light sources positioned around the opening, and one or more moveable panels covering the display unit. The housing may be positioned so that a portion of the display unit is visible through the opening when the panels are opened. The controller may be operatively coupled to the display unit, the value input device, the light sources and the moveable panels. The controller may include a processor and a memory operatively coupled to the processor. The controller may be programmed to cause the display unit to generate a display on the visible portion of the display unit relating to a game, to cause the moveable panels to open to reveal the visible portion of the display unit when the display is generated, to cause the light sources to emit light when the display is generated, and to determine a value payout associated with an outcome of the game.

Additional aspects of the invention are defined by the claims of this patent.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
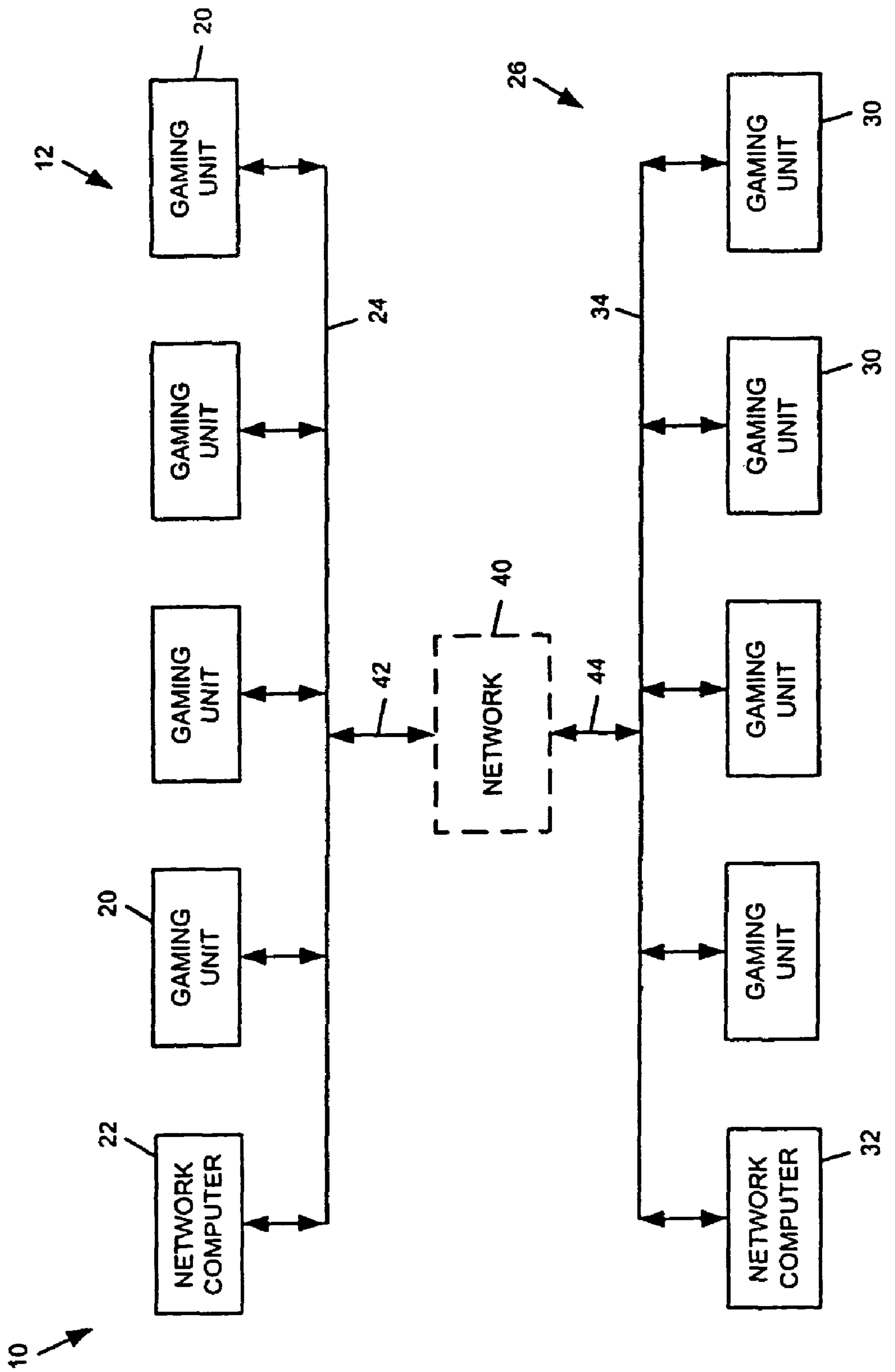
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Figure 2:
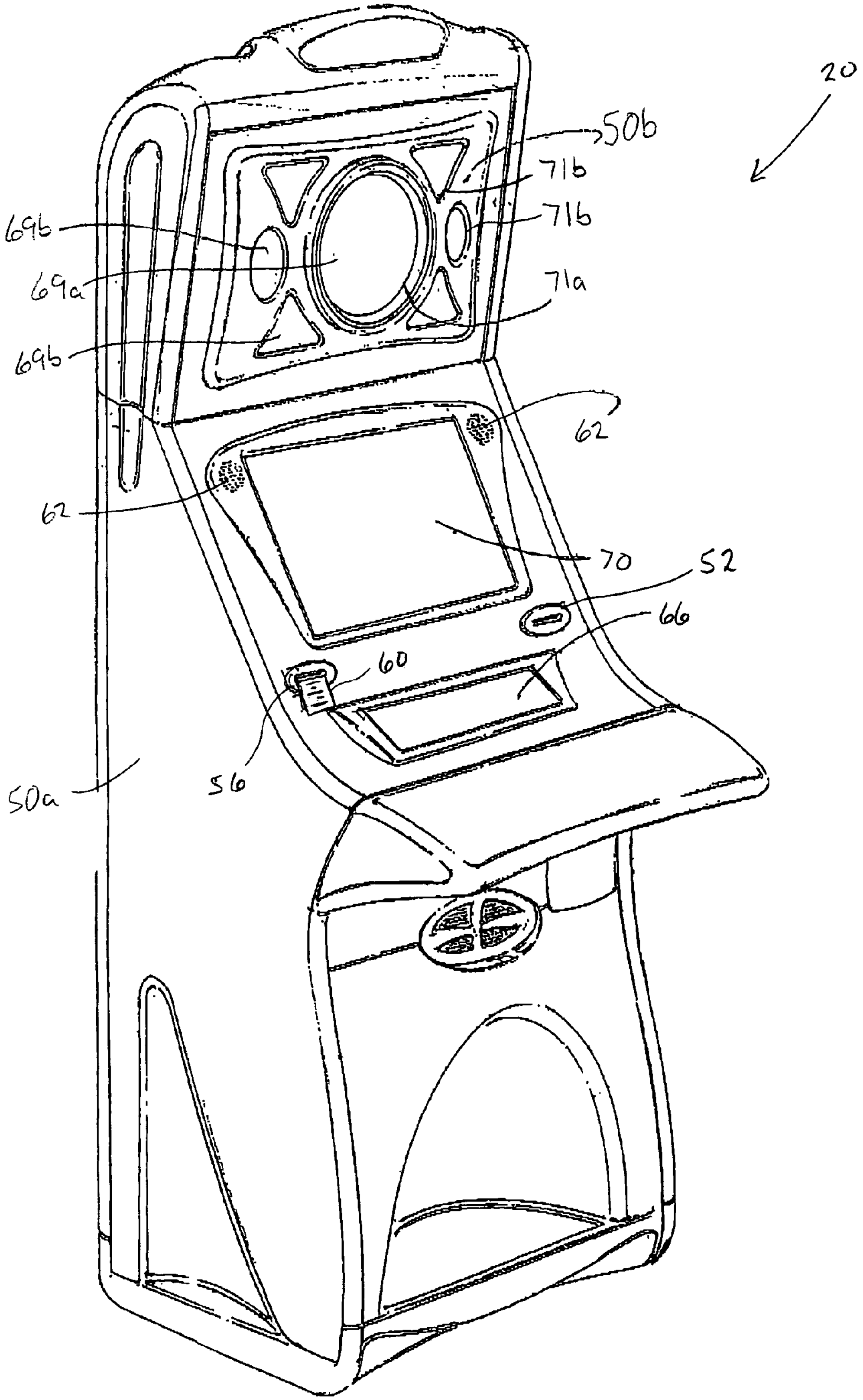
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50*a*, 50*b* and one or more input devices, which may include a coin slot or paper currency acceptor 52 and a ticket reader/printer 56, which may be used to input value to the gaming unit 20. A value input device may include any device that can accept value from a customer. The gaming unit 20 may also include a card reader (not shown) as a value input device. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader may include any type of card reading device, such as a magnetic card reader or an optical card reader, and may be used to read data from a card offered by a player, such as a credit card or a player tracking card. If provided for player tracking purposes, the card reader may be used to read data from, and/or write data to, player tracking cards that are capable of storing data representing the identity of a player, the identity of a casino, the player's gaming habits, etc.

The gaming unit 20 may include one or more audio speakers 62, an input control panel 66, and one or more display units 69, 70. A coin payout tray (not shown) may also be included. In the case of multiple display units, a display unit 69 may function as a display unit for a top glass and a display unit 70 may function as a primary display unit. A bottom (or "belly") glass may include a separate display unit (not shown) or the bottom glass may be a display area apportioned from the display unit 70. Likewise, the display unit 69 may be replaced with a display area apportioned from the display unit 70. An example of how a single display unit may be apportioned into various display areas is disclosed in U.S. patent application Ser. No. 10/176,341 entitled "Display Panel for a Gaming Apparatus," which was filed on Jun. 20, 2002 and which is hereby expressly incorporated by reference herein.

Where the gaming unit 20 is designed to facilitate play of a video casino game, such as video poker or video slots, one or more of the display units 69, 70 may be color video display units that display images relating to the particular game or games. Where the gaming unit 20 is designed to facilitate play of a reel-type slot machine, one or more of the display units 69, 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
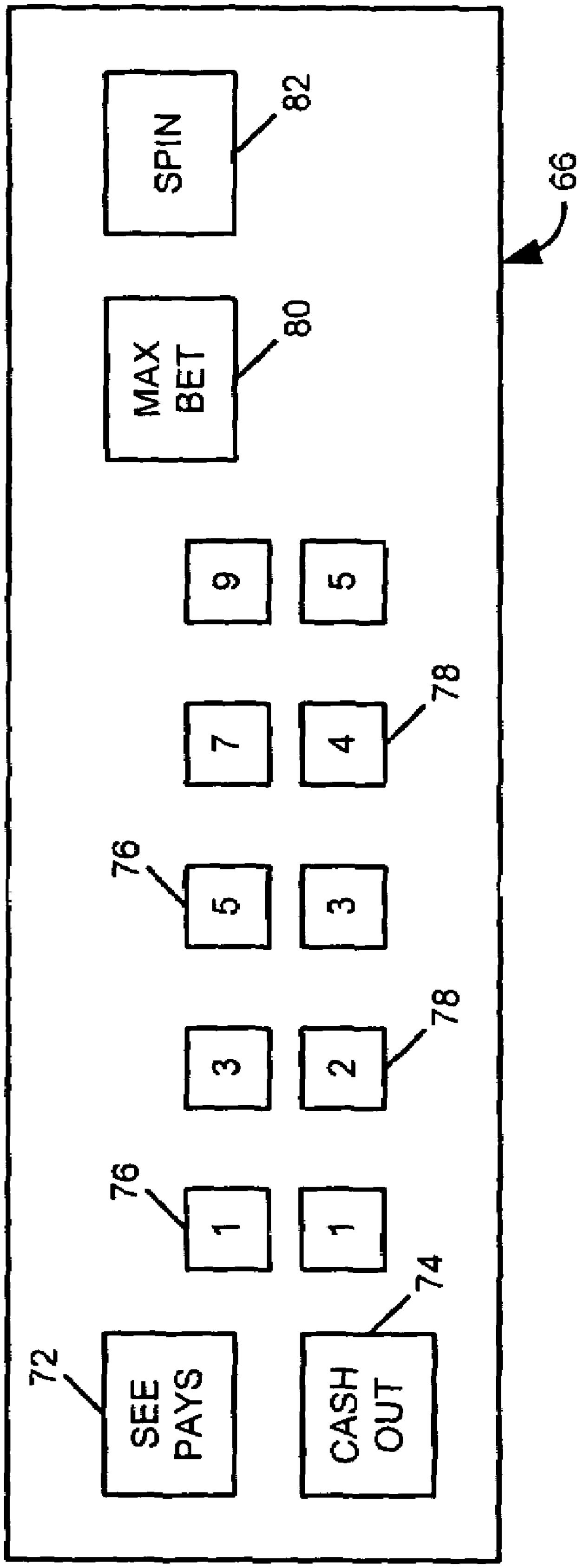
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, if one or more of the display units 69, 70 is provided in the form of a video display unit, the control panel 66 may include a "See Pays" button 72 that, when activated, causes the display units 69, 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray or electronically encoding value to the player tracking card, the player's account, a credit card, a ticket voucher 60, etc.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50*a*, 50*b* of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If one or more of the display units 69, 70 is provided as a video display unit, the control panel 66 could be generated by the display units 69, 70. In that case, each of the buttons of the control panel 66 could be a colored area generated by the display units 69, 70, and some type of mechanism may be associated with the display units 69, 70 to detect when each of the buttons was touched, such as a touch-sensitive screen.

Top Box Display

The display unit 69 of a top box may be a single display that displays video images on a screen (not shown) apportioned into multiple display areas, such as a primary display area 69*a*, and several satellite display areas 69*b*. The number of display areas in the top display may vary according to the overall requirements of the gaming unit, the game routine(s) or the preferences of the manufacturer. For example, the gaming unit 20 may include multiple display areas 69*a*, 69*b* or only a single, primary display area 69*a*. In addition, the number, shape, placement and dimensions of the display areas 69*a*, 69*b* may be varied anywhere within the screen of the display unit 69. The following will describe a gaming apparatus using a single display unit 69 for the top display. However, as understood by those of ordinary skill in the art, and as described above, more than one video display unit may be used to show one or more of the display areas and the description of the display unit 69 below may be applicable to any video display unit in a gaming unit 20, including the display unit 70.

The display unit 69 may be a flat display screen having a 16:9 aspect ratio (i.e., width-to-height ratio), though other screen proportions may be used as well. The proportions of the display unit 69 may be dependent on the desired attributes of the display areas 69*a*, 69*b*. As seen in FIG. 2, each of the display areas 69*a*, 69*b* may vary in shape, placement and dimensions on the gaming unit 20. For example, the primary display area 69*a* may be larger and centered on the top box, whereas the satellite display areas 69*b* may be smaller and arranged around the primary display area 69*a*. To use a single display unit 69 for all display areas 69*a*, 69*b*, a display unit 69 may have a screen height at least equal to the distance from the top of the uppermost desired display area to the bottom of the bottommost desired display area. The width may generally be the widest point between the rightmost and leftmost edges of the display areas.

The above has been described in terms of the dimensions of the screen of the display unit 69 for the gaming unit 20. As can be seen from this disclosure, the disclosed embodiments are applicable to gaming units that may be embodied in a variety of devices ranging from handheld devices such as personal digital assistants (PDA), cellular or standard phones with display screens, computer screens, televisions, large projection screens, or any other device that may include a video display unit. Given that the gaming unit may be embodied in a variety of devices that may range in size, the actual size of the display unit 69 may also vary widely.

The display unit 69 may comprise a large area plasma display panel (PDP), a liquid crystal display (LCD), a liquid crystal on silicon (LCOS) display, a light emitting diode (LED) display, a ferroelectric LCD display, a field emissions display (FED), an electroluminescent display (ELD), a front projection display, a rear projection display, and a microelectromechanical device (MEM) display such as a digital micromirror device (DMD) display or a grating light valves (GLV) display, etc. The display unit 69 may further include organic display technologies such as an organic electroluminescent (OEL) display and an organic light emitting diode (OLED) display, as well as a light emitting polymer display. The display unit 69 is not limited to flat-panel-display (FPD) technology though most of the above examples are different types of FPD technology that make the depth of the display unit 69 relatively shallow. CRT display technology, including short neck or bent neck CRTs, may be used for the display unit 69. In addition, the display unit 69 may be a touch-sensitive display for control of a game routine by a player such that one display area may display the gaming icons whereas a second display may display the controls for operating the game.

Figure 2B:
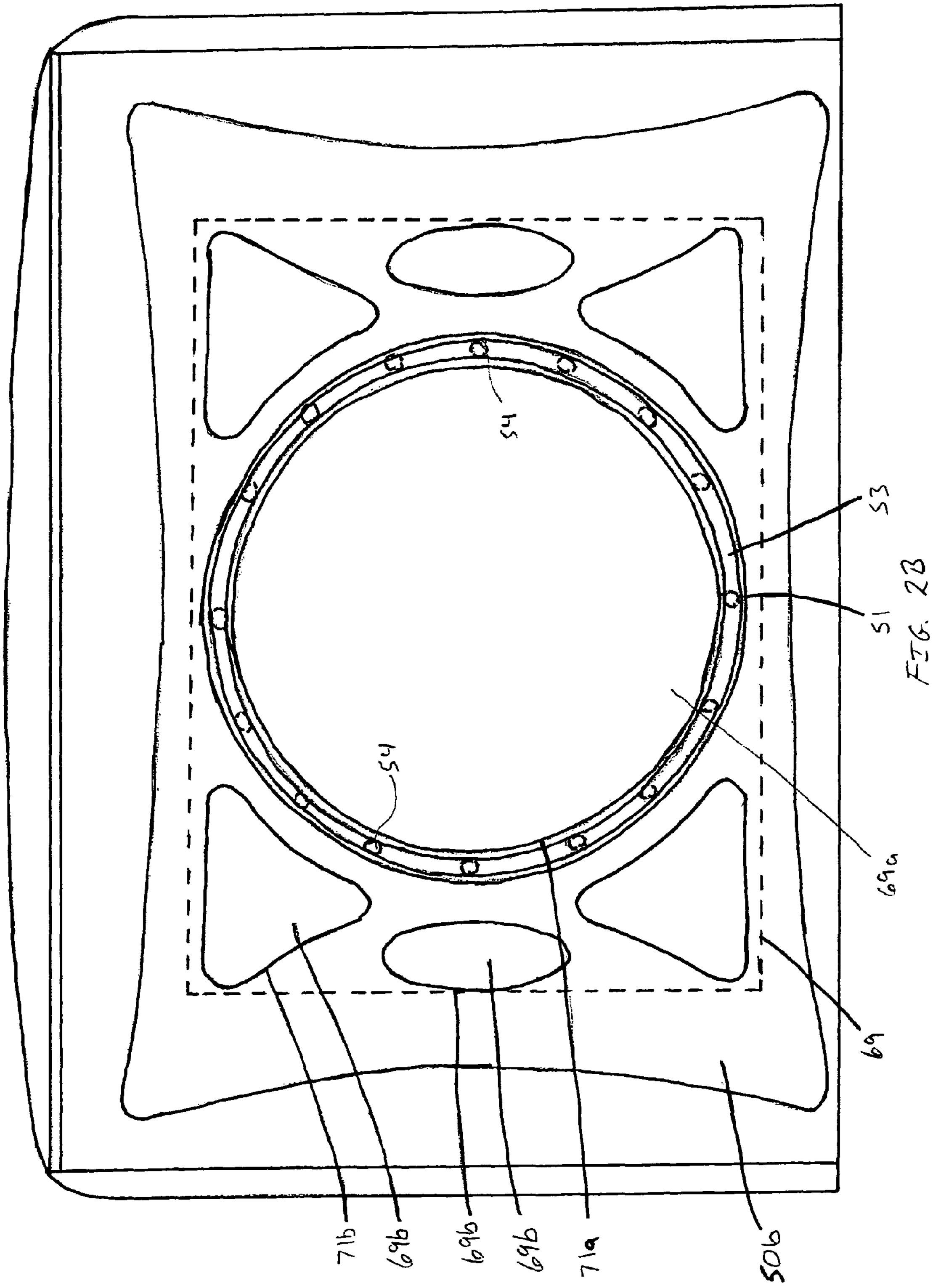
FIG. 2B illustrates an embodiment of a front panel for a gaming unit.

The housing may include a main housing 50*a* and a front panel 50*b*. FIG. 2B illustrates one possible embodiment of a front panel 50*b* as shown in FIG. 2, which may be used to overlay the display unit 69 of a top box. Referring to FIG. 2B, the top box is shown with a flat screen display unit 69 depicted as a dotted line. The front panel 50*b* may be removably positioned over the display unit 69. Similar positioning may be accomplished with multiple video display units 69, 70 where the front panel 50*b* may be removably positioned over only one or more, but not all, of the video display units 69, 70 or only partially over a display unit 69, 70. However, as an alternative embodiment, the front panel 50*b* may also overlay the entire display unit 69 as shown in FIG. 2B, or all the video display units 69, 70.

The front panel 50*b* may be designed in relation to the game routine(s) that are played on the gaming unit 20 or designed in accordance with an overall theme of a group or carousel of gaming units. If the gaming unit 20 is reprogrammed with a different game routine, the front panel 50*b* may be removed and replaced with a new front panel having a design corresponding to the new game routine(s). Attachment or detachment may be achieved by a variety of devices, such as screws, bolts, metal/plastic snaps, clips, or any other removable fastening devices as known in the art.

The front panel 50*b* may further include cutouts or openings 71*a*, 71*b* corresponding to the display areas of the gaming unit 20 (i.e., the primary display area 69*a*, and the satellite display areas 69*b*). In order to show video images through the openings 71*a*, 71*b*, a computer or controller for the gaming unit 20 may include graphics software for programming the display areas 69*a*, 69*b* to be displayed on the display unit 69 in accordance with the shape, placement and dimensions of the openings 71*a*, 71*b* of the front panel 50*b*. The graphics software may be software similar to that used for concurrently displaying various screens or display areas on computer screens or television screens. The front panel 50*b* thereby acts as a framework for the top box (or any other desired part) of the gaming unit 20 by overlaying and covering those portions of the display unit 69 that may not have graphics while allowing the player to view those portions of the display unit that have graphics (i.e., display areas 69*a*, 69*b*). In effect, the openings 71*a*, 71*b* of the front panel 50*b* and the display areas 69*a*, 69*b* of the display unit 69 together end up representing display panels without using a naked display, yet may allow each display panel to include active video images with fewer display units.

As with the display areas 69*a*, 69*b*, the openings 71*a*, 71*b* may vary in shapes, placement and dimensions with respect to other openings in the front panel 50*b* or with respect to openings of other front panels just as the display unit 69 may be apportioned into display areas of varying shapes, placement and dimensions. In one embodiment, the openings 71*a*, 71*b* may be an array of squares. The openings 71*a*, 71*b* may further include a transparent material such as glass, plexiglass, plastic, etc. to protect the display unit 69 yet permit the player to view the images. The gaming unit 20 may be updated in its appearance and/or game routine(s) by merely programming the controller with the graphics software of the new game routine(s) and replacing the removable front panel 50*b* with a new front panel corresponding to the new game routine(s). The gaming unit 20 may be reprogrammed locally or via the download of the new game routine(s), which may be accomplished from the network computer 22, 32, the network 40 or another remote location. Therefore, an entire gaming unit can be transformed into a different gaming unit with relative ease and/or games may be interchanged with relative ease.

Alternatively, in the case of multiple video display units 69, 70, two or more of the openings 69*a*, 69*b* may overlay a single display unit 69 as described above, while other openings may correspond to individual video display units 70. The graphics software may program each display unit 69, 70 to display video images corresponding to the one or more areas that the display unit 69, 70 represents. The video images for each opening or display unit 69 may vary among each display area 69*a*, 69*b*. For example, the primary display area 69*a* may include video images representing a bonus game or game instructions. A bonus game may occur for any reason, whether randomly or based on an event related to a game routine displayed on the display unit 70. The bonus game may be an extra iteration of the main game routine without requiring an extra wager, or a game different from the main game routine. The satellite display areas 69*b* may display other video images, illustrations or instructions relating to the game routine, including minimum bet requirements, player selections, bonus amounts, bonus cards, wild cards, etc. Examples of video images relating to the performance of the game routines such as video poker, video slots, video blackjack, video keno and video bingo are described in further detail below. In a further example, the display areas 69*a*, 69*b* together could display a single, continuous image where the primary display area 69*a* displays the center of the image and the satellite display areas 69b display surrounding portions of the image. The video images described above are merely examples and are not limited in type or to any particular display area. Each of the video images may be either static, active (e.g., multimedia video) or a combination of both. Furthermore, the video images may be in either color or grayscale. Each of the display areas 69*a*, 69*b* may display various images as part of an attraction sequence when the game routine is not performed. An example of an attraction sequence is further described below.

A bezel 51 may be used to frame one or more of the openings 71*a*, 71*b* in the front panel 50*b*. Though a bezel may include an edge that slopes to meet the surface of the display unit 69, those of ordinary skill in the art will readily understand that the bezel 51 may refer to a plate or panel used to frame a display area and that the edge of the bezel may run perpendicular to the surface of the display unit 69 or the front surface of the bezel 51 may be flush or nearly flush with the surface of the display unit 69. The shape and size of the bezel 51 may be dependent on the shape and size of the openings 71*a*, 71*b*. The bezel 51 may include a ring 53 which may include one or more lights 54. The lights 54 may be neon gas-filled lights, florescent lights, incandescent lights, light emitting diodes (LEDs) or any other light source 54. The lights 54 may be positioned beneath a transparent or translucent material such as plastic, glass, etc. which may be colored and/or patterned. The lights 54 for a bezel 51 may be all the same or vary in color, size, brightness, etc., and may vary in color, size, brightness, pattern, etc. for various openings 71*a*, 71*b*.

The bezel 51 and/or the ring 53 may be mounted on a track operatively coupled to a motor which allows the bezel 51 and/or the ring 53 to rotate or perform other mechanical motions. Other mechanics, such as mechanical reels, may be provided on the front panel 50*b* to provide mechanical motion. The bezel 51 may be used to frame the mechanics. The bezel 51 may initiate its lights 54 and/or mechanical motion upon the occurrence of an event (e.g., a bonus, a player input, etc.) or as part of a player attraction sequence described further below to draw the player's attention to the display unit 69, to a particular display area 69*a*, 69*b* or to the gaming unit 20 in general. For example, if a bonus event occurs based on game play on the display 70, the lights 54 may be activated and/or the bezel 51 may engage in mechanical motion to attract the player's attention to the display unit 69 or to a particular display area 69*a* of the display unit 69. The lights 54 may be activated to turn on, flash, brighten, alternately brighten and dim, etc. If multiple lights 54 are provided, some lights may be turned on for a period of time when others are turned off, and vice versa to create patterns of light in the bezel 51 which may create the impression that the light is moving throughout different portions of the bezel 51. If the players attention is not longer needed on the display unit 69 or display area 69*a*, 69*b* or if the player's attention is needed at another display unit 70 or display area 69*b*, or if, the bezel 51 may turn off the lights 54 and/or disengage in mechanical motion, and a bezel for the active display unit 70 or display area 69*b* may be activated.

Figure 2C:
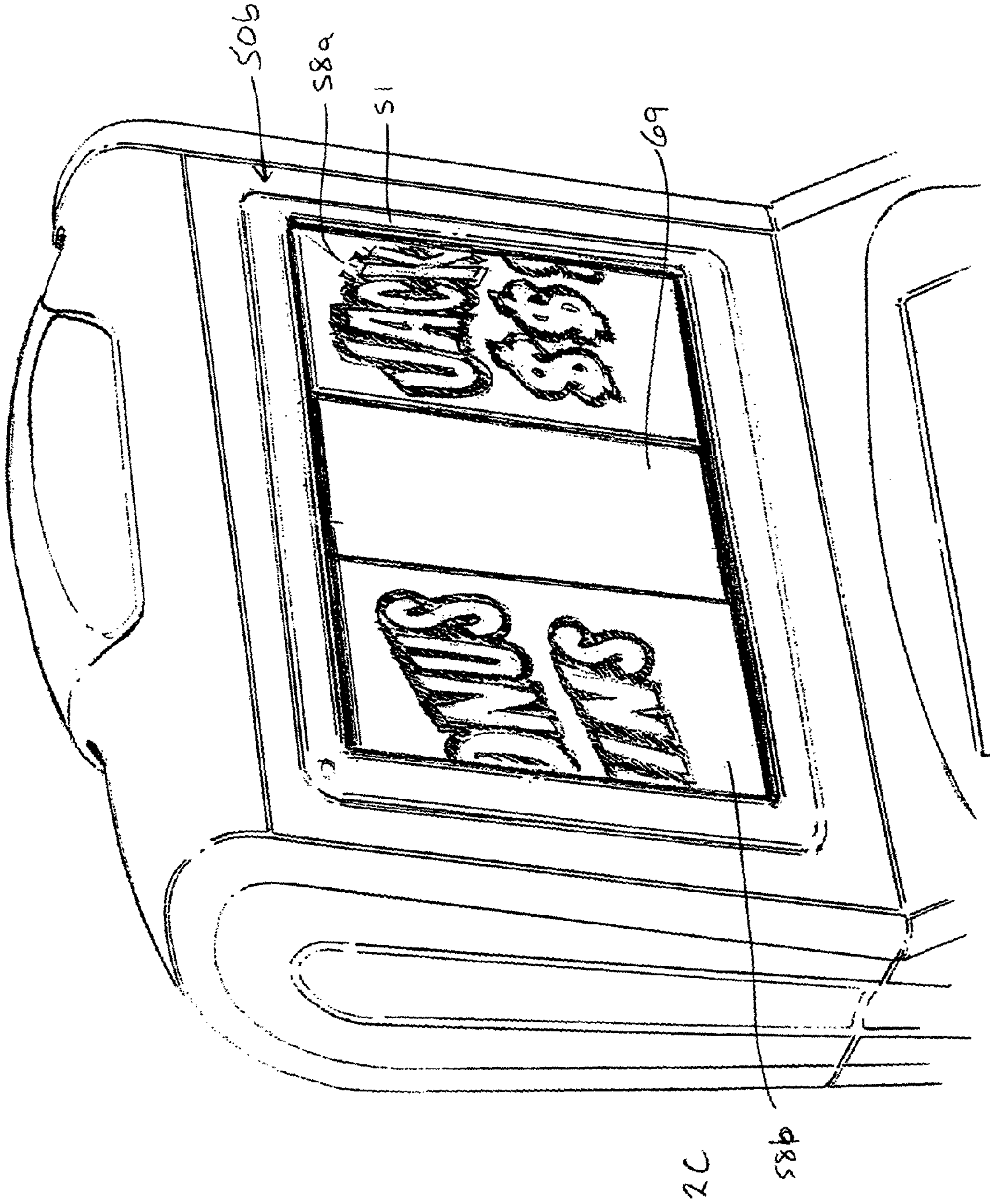
FIG. 2C illustrates another embodiment of a front panel for a gaming unit.

FIG. 2C illustrates another possible embodiment of a front panel 50*b*, which may be used to overlay the display unit 69 of a top box. Referring to FIG. 2C, the front panel 50*b* may include mechanical doors or panels 58*a*, 58*b* driven by one or more belts and motors or other mechanical devices, as known to those of ordinary skill in the art, to open and close the panels 58*a*, 58*b*. The opening and closing of the panels 58*a*, 58*b* may be used to reveal or conceal the display unit 69 or a display area 69*a*, 69*b*. For example, the panels 58*a*, 58*b* may automatically open upon occurrence of a particular event, including the person making an input to the gaming unit 20 (e.g., placing a wager, inserting a player tracking card, button selection, etc.). The panels 58*a*, 58*b* may also automatically open upon occurrence of a bonus event or any other event when it is desired to direct the player's attention to the display unit 69. When the panels 58*a*, 58*b* open to reveal the display unit 69, the panels 58*a*, 58*b* may be opened outward, or drawn along a track into a cavity behind the front of the housing 50 or a cavity on either side of the display unit 69 and extending into the gaming unit 20. The panels 58*a*, 58*b* may be made of a flexible material or linked ribs that allow the panels 58*a*, 58*b* to be rolled up on a spindle mounted in the gaming unit 20, along a track into a cavity hidden behind the front of the housing 50 or into a cavity in the gaming unit 20 on either side of the display unit 69.

A bezel 51 as mentioned above may be provided around the panels 58*a*, 58*b* to hide any tracks, motors, belts, cavities or other mechanisms used to open and close the panels 58*a*, 58*b*. When an event occurs to cause the panels 58*a*, 58*b* to open, the bezel 51 may initiate its own lights 54 and mechanisms to attract the player. Just prior to or simultaneous to the panels 58*a*, 58*b* opening, the display unit 69 may begin to display images. The combination of the panels opening 58*a*, 58*b*, the lights 54 and mechanical motion of the bezel 51, and the activation of images on the display unit 69 may thereby work in conjunction to attract the player's attention to the display unit 69 or a display area 69*a*, 69*b*. When the player's attention is no longer needed on the display unit 69 or display area 69*a*, 69*b*, the panels 58*a*, 58*b* may close, the images may be discontinued and the bezel 51 may discontinue the lights 54 and mechanisms. Though FIG. 2C depicts two panels 58*a*, 58*b* opening to either side of the display unit 69, it will be readily understood that a single panel or multiple panels may be used and may open in a variety of manners and directions.

Gaming Unit Electronics

Figure 3:
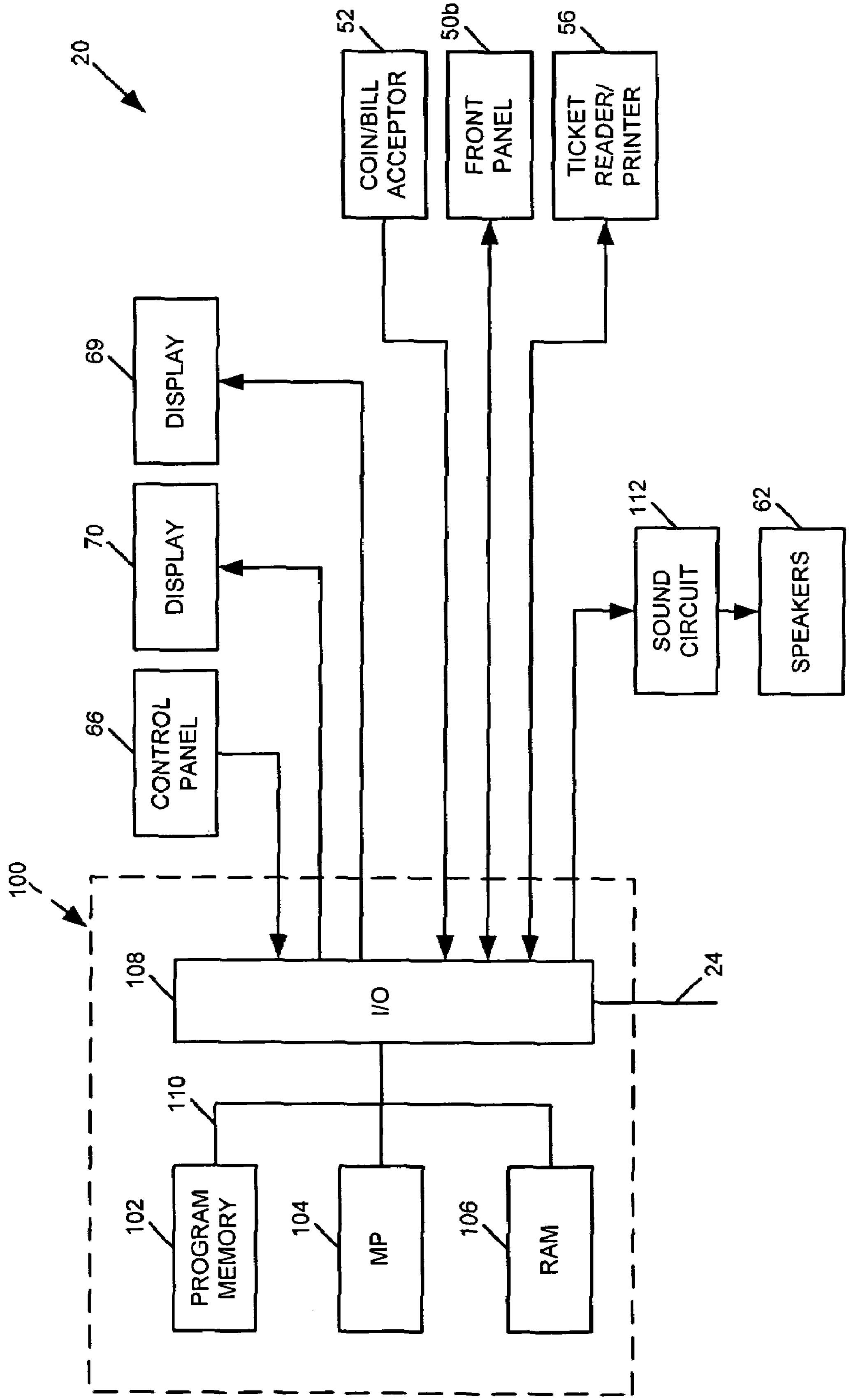
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the front panel 50*b*, the coin/bill acceptor 52, the ticket reader/printer 56 or any other value input device may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 50*b*, 52, 56, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Front Panel Electronics

Figure 3A:
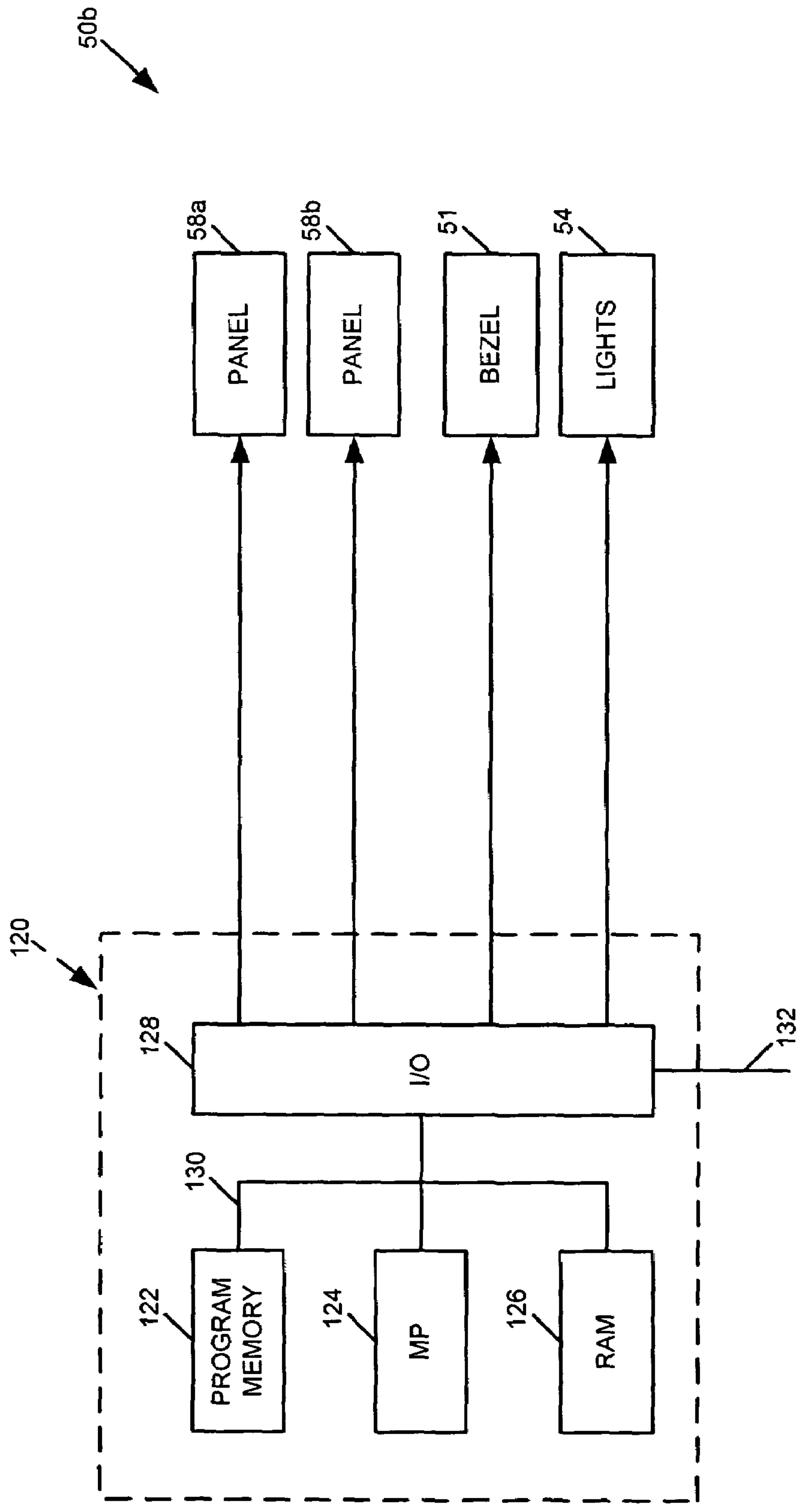
FIG. 3A is a block diagram of electronic components of a front panel of FIGS. 2 and 3.

FIG. 3A is a block diagram of a number of components that may be incorporated in the front panel 50*b*. Referring to FIG. 3A, the front panel 50*b* may include a panel controller 120 that may comprise a program memory 122, a microcontroller or microprocessor (MP) 124, and random access memory (RAM) 126 and an input/output (I/O) circuit 128, all of which may be interconnected via an address/data bus 130. The microprocessor 124 may be microprocessor model number PIC 12C509 manufactured and sold by Microchip Technology of Chandler, Ariz. The panel controller 120 may be used to control the activation of the bezel 51, the lights 54 and the panels 58*a*, 58*b*. The panel controller 120 may operate in conjunction with the controller 100 to activate the bezel 51, the lights 54, and the panels 58*a*, 58*b* when a display area 69*a*, 69*b* is activated on the display unit 69 or a player's attention is to otherwise be directed to a particular display area 69*a*, 69*b*. In one embodiment, the panel controller 120 may be the controller 100, described above. In another embodiment, the panel controller 120 may be a peripheral device that is coupled to the controller 100 via a data link 132 which may be a serial communications link. A serial communications link and associated equipment manufactured under the trademark SENET® by IGT Corporation of Reno, Nev. may be used. The I/O circuit 128 may be a SENET® connector or coupled to a SENET® connector.

FIG. 3A illustrates that the bezel 51, the lights 54 and the panels 58*a*, 58*b* and may be operatively coupled to the I/O circuit 128. Although shown as single, unidirectional links coupled to the I/O circuit 128, different connection schemes may be used which may couple one or more of the components to the I/O circuit 128 via a common bus or data link, or directly to the microprocessor 124 without passing through the I/O circuit 128. The components 51, 54, 58*a*, 58*b* may also be coupled using a bi-direction link and/or a multiple-line data link. For example, each of the lights 54 may be coupled to a different link for independent control of each light 54. This may be used to turn some lights on and others off. If the lights 54 are multiple colors, some lights 54 may remain on and the others off to display a particular color. In one example, each link may be dedicated to a particular signal regarding the length of time the light 54 is to remain on. When activated, the signal over one link may cause the light 54 to remain on for 25% of a cycle of time and off for 75% of the time. In other words, the lights 54 may flash on for 25% of the cycle, turn off for the remainder of the cycle and then turn on again for 25% of the cycle. A signal over another link may cause the light 54 to be one for 50% of the time and off for 50% of the time. Similarly, a signal over yet another link may cause the light 54 to remain on for 75% of the time and a signal over still another link may cause the light 54 to remain on for 90% of the time. If no signals are provided, all the lights may be turned off. The signal may be represented as either a high state or a low state over the links. The number of variations of the on/off states may depend on the number of links and the cycle of time may be varied by the panel controller 120 to control the speed of the on/off operations. The current supplied to the lights 54 may be varied by the panel controller 120 to control the intensity of the light emitted. Similarly, the rate of rotate of the bezel 51, and the opening and closing of the panels 58*a*, 58*b* may be controlled by the panel controller 120.

Figure 3B:
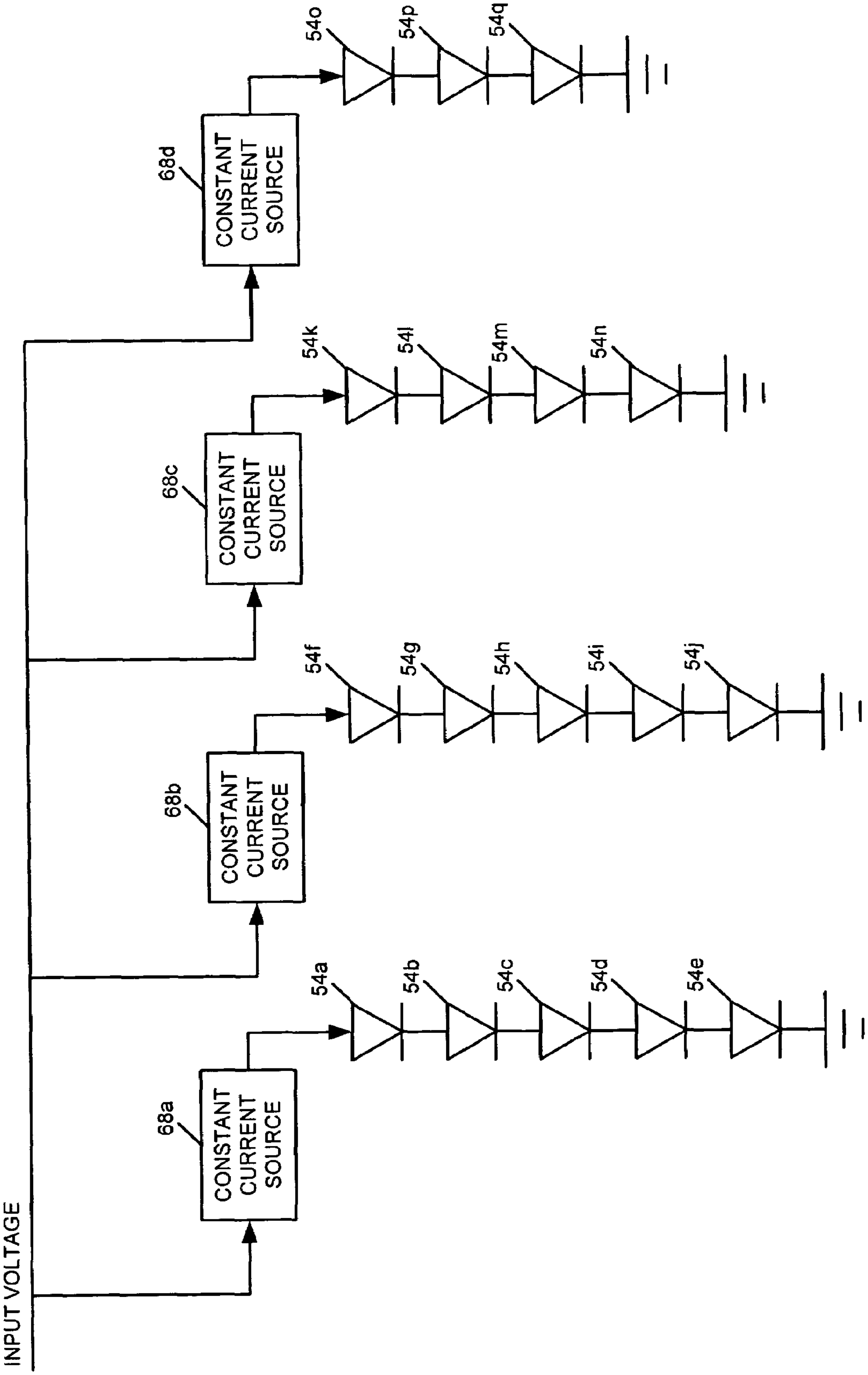
FIG. 3B is a circuit diagram of electronic components of a light assembly.

FIG. 3B is a circuit diagram illustrating a manner in which the lights 54 may be controlled. Lights 54 of particular colors may be controlled via varying the on/off time across a series of constant current source devices 68*a*-68*d* that supply current to lights 54 arranged in a series connection (e.g., a string of LEDs). In order to change the amount of light emitted from the LEDs, voltage provided to the constant current source devices 68*a*-68*d* may be switched on and off for a specific amount of time. This may also be known as pulse width modulation. Different colored lights 54 may have a different voltage drop across the light 54. For example, a red LED may have about 1.8 volts of drop, green LEDs may have about 3.4 volts of drop, blue LEDs may have 3.8 volts of drop and white LEDs may also have about 3.8 volts of drop. The blue and white LEDs may have the same voltage drop if blue LEDs are used to create a white LED. White emitting phosphors may be embedded in a transparent plastic, which may be the bezel 51 or ring 53, that covers the blue LED. Then the blue LED is turned on, the blue light hits the phosphor around the LED which emits white light.

As shown in FIG. 3B, the strings of LEDs may be different lengths, which may vary the required voltage drop across all the LEDs. For example, if lights 54*a*-54*e* are white LEDs each requiring about 3.8 volts, the total voltage drop would be about 19 volts. If lights 54$k$-54$n$ are also white LEDs, the required voltage drop would be about 11.4 volts. If the input voltage to the entire system is below about 19 volts but above about 11.4 volts, lights 54$a$-54$e$ will be off and lights 54$k$-54$n$ will be on. To avoid hot and cold spots within the array of lights 54, for example if the lights 54$a$-54$q$ are arranged in a ring starting with light 54$a$ and ending with light 54$q$, the power may be multiplexed on and off.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
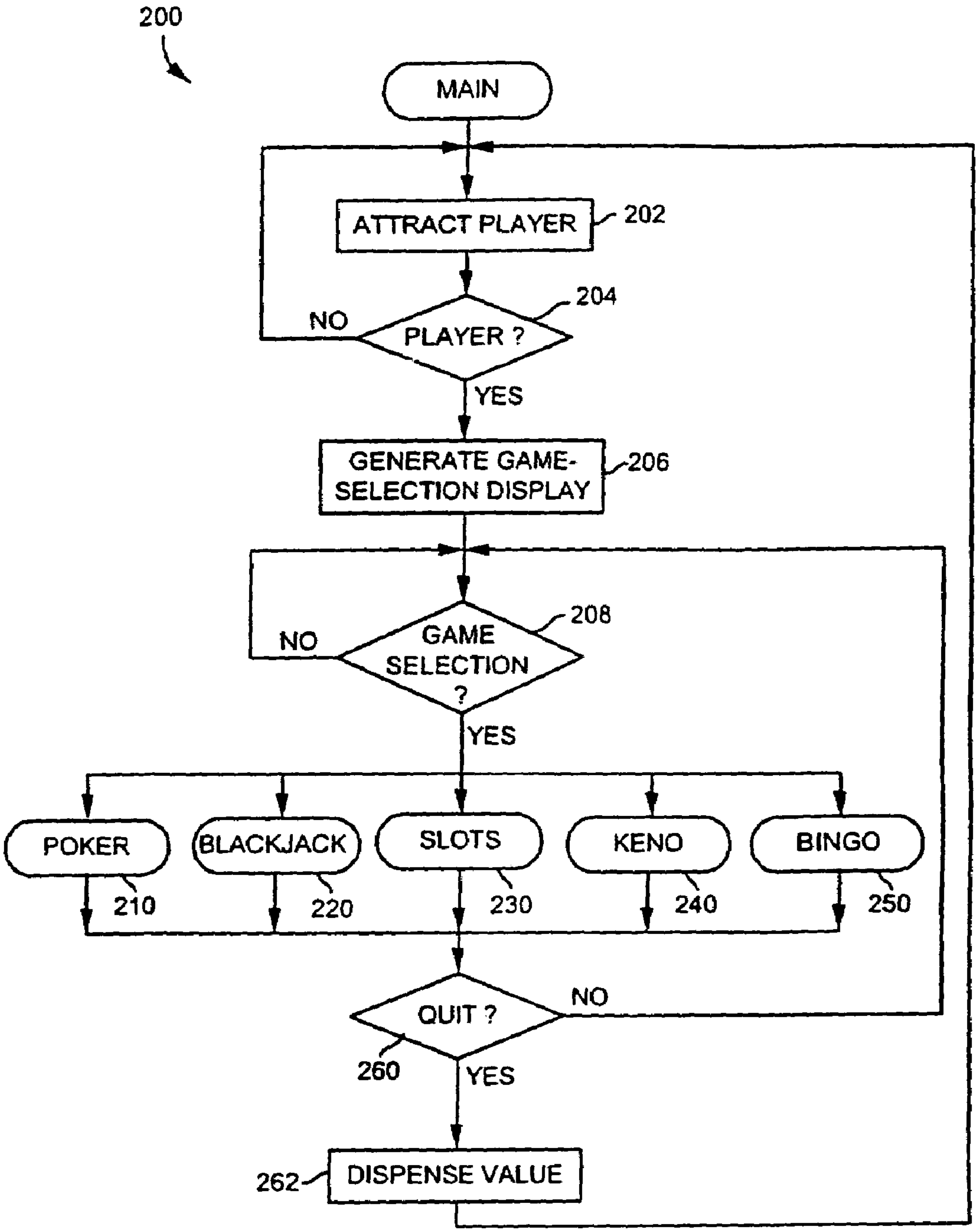
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 (if provided as a video display unit) at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
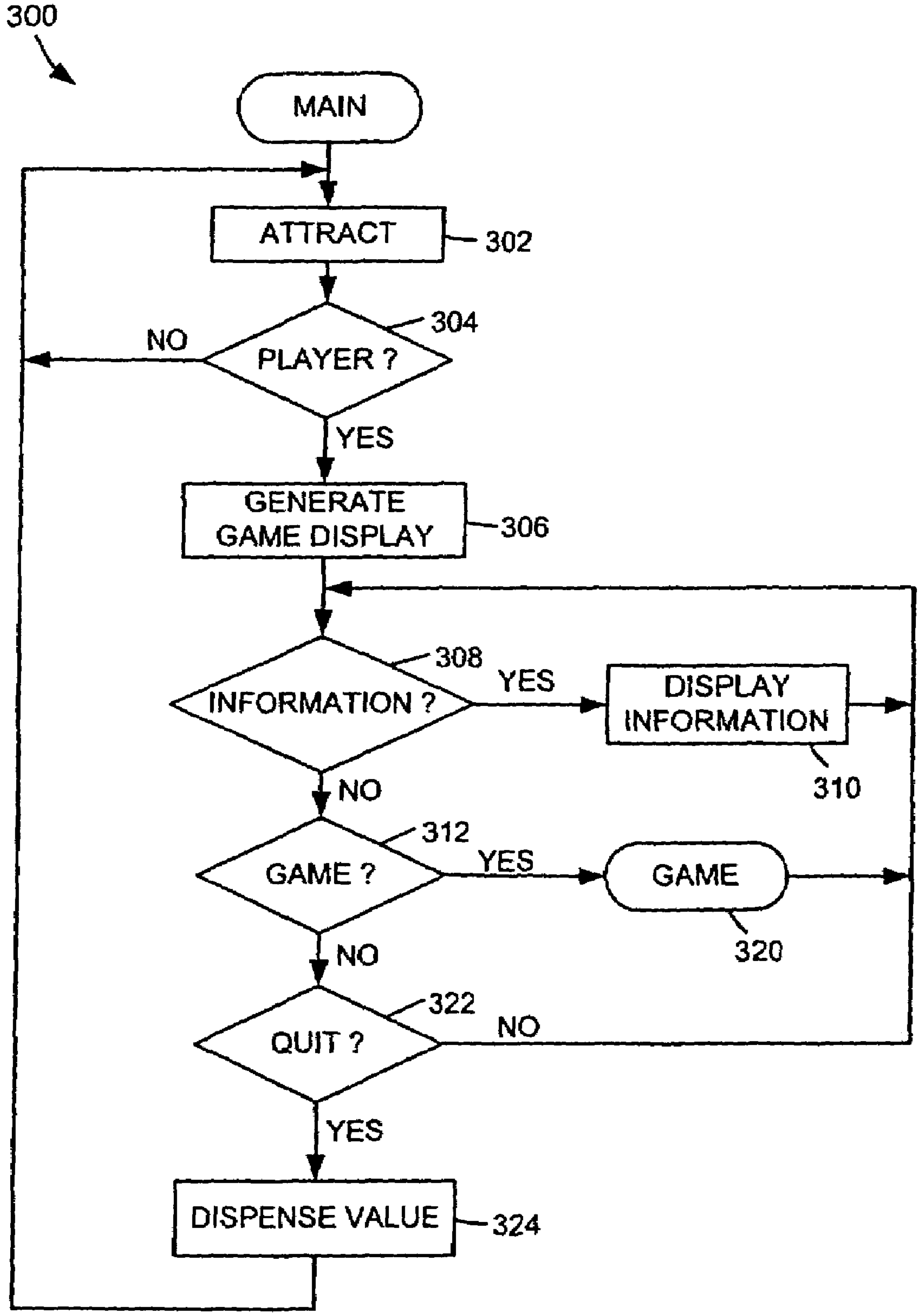
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 (if provided as a video display unit) at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Figure 6:
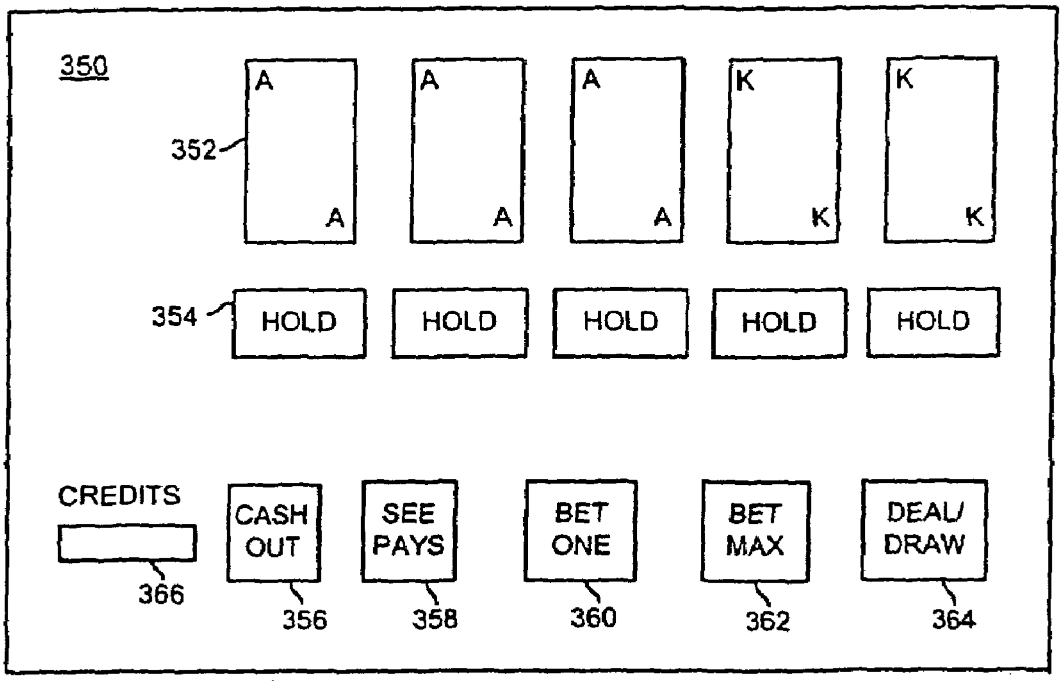
FIG. 6 is an illustration of an embodiment of a visual display that may be displayed during performance of the video poker routine of FIG. 8.

Video Poker

Where the gaming unit 20 is designed to facilitate play of a video poker game, the display unit 70 may comprise a video display unit. FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
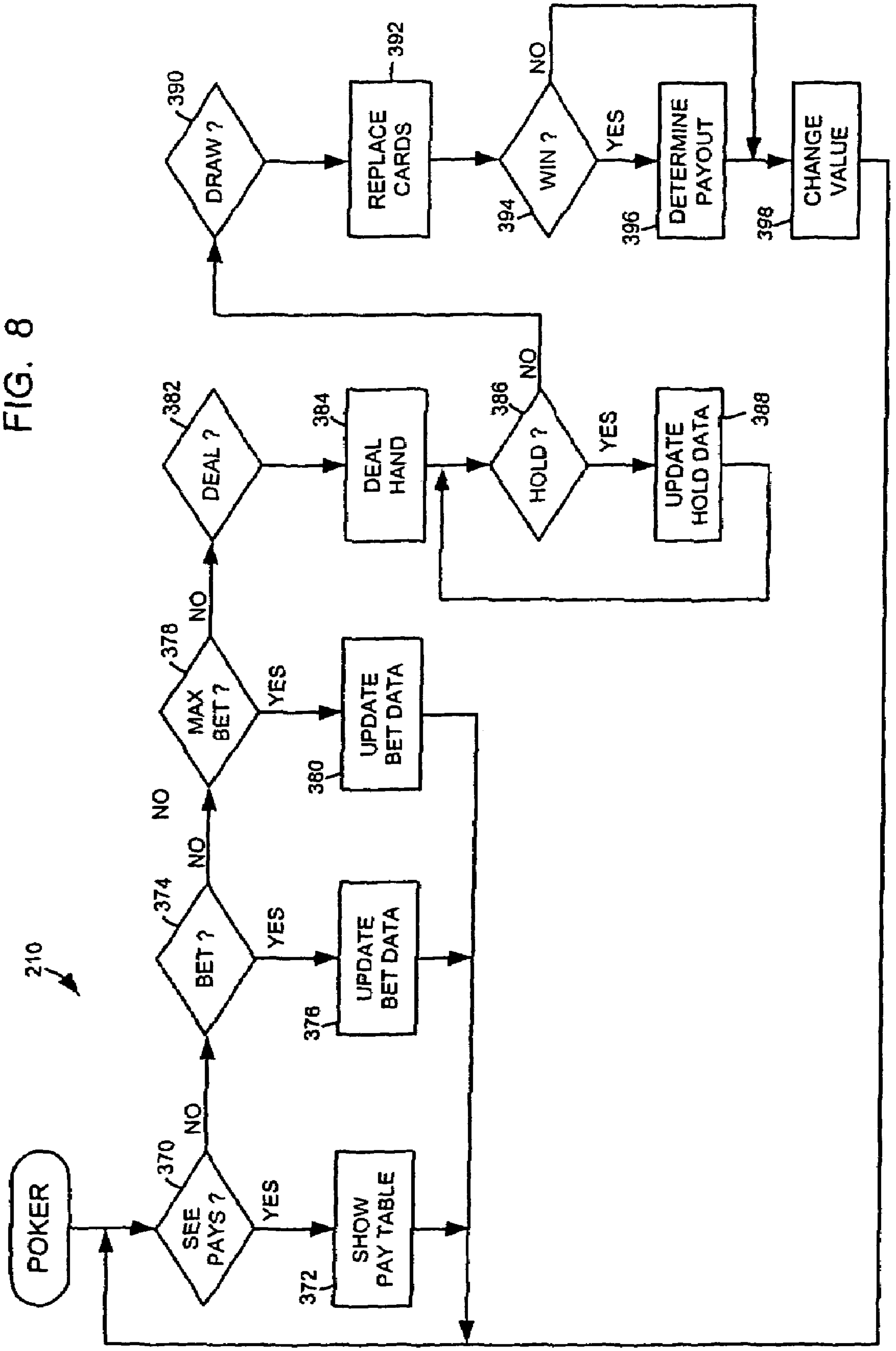
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 7:
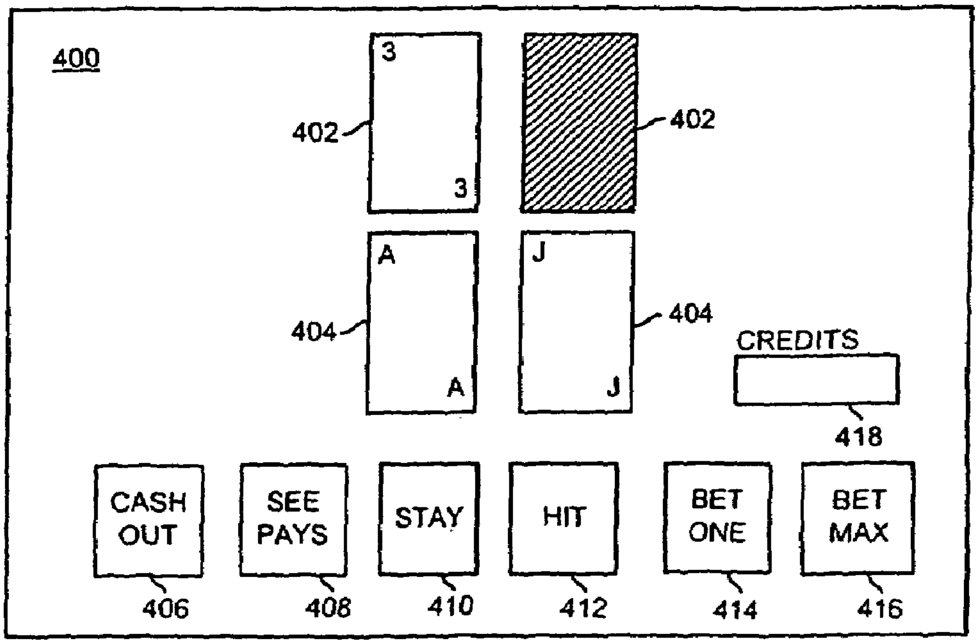
FIG. 7 is an illustration of an embodiment of a visual display that may be displayed during performance of the video blackjack routine of FIG. 9.

Video Blackjack

Where the gaming unit 20 is designed to facilitate play of a video blackjack game, the display unit 70 may comprise a video display unit. FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
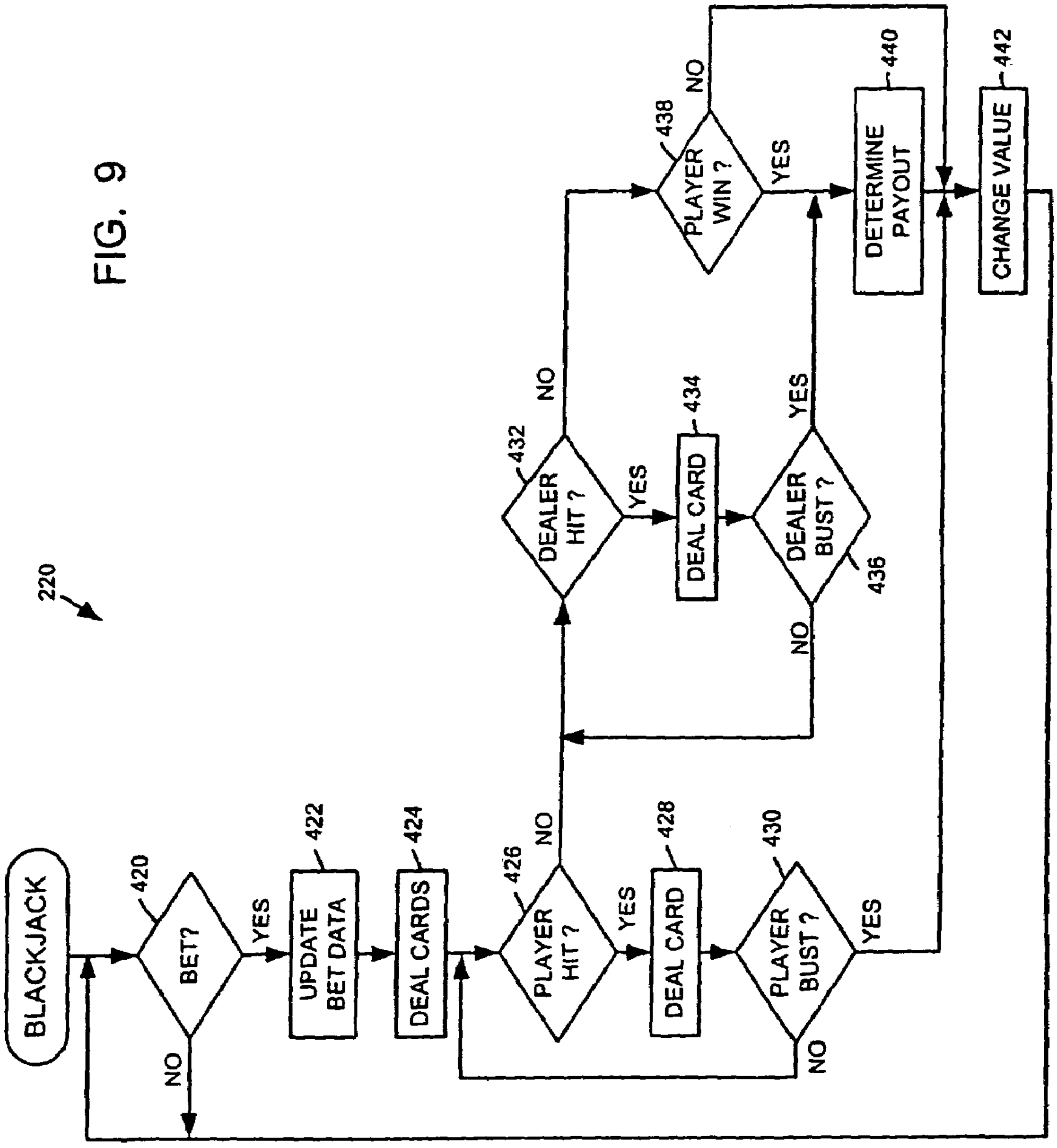
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

Where the gaming unit 20 is designed to facilitate play of a video slots game, the display unit 70 may comprise a video display unit. FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
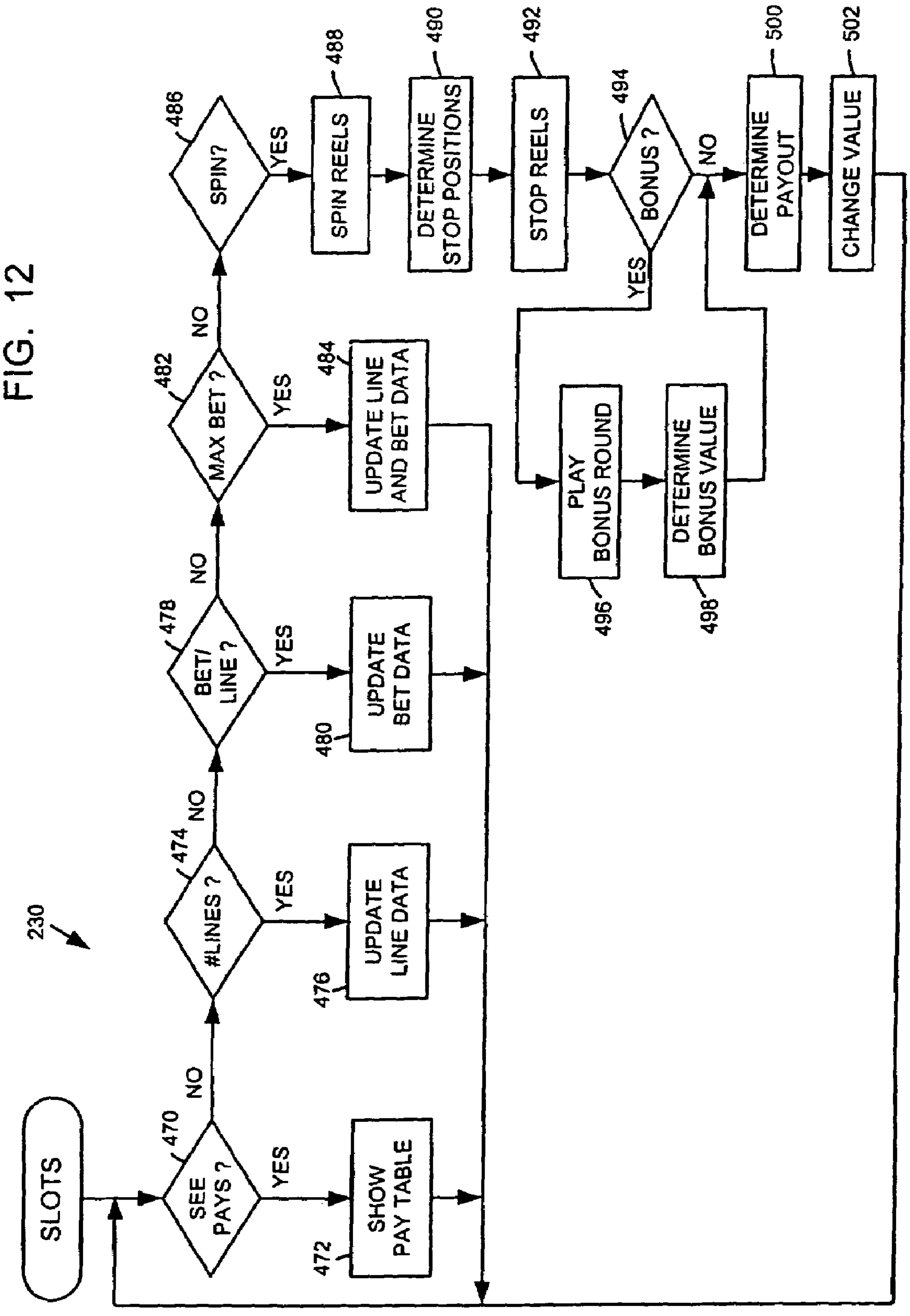
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Video Keno

Where the gaming unit 20 is designed to facilitate play of a video keno game, the display unit 70 may comprise a video display unit. FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
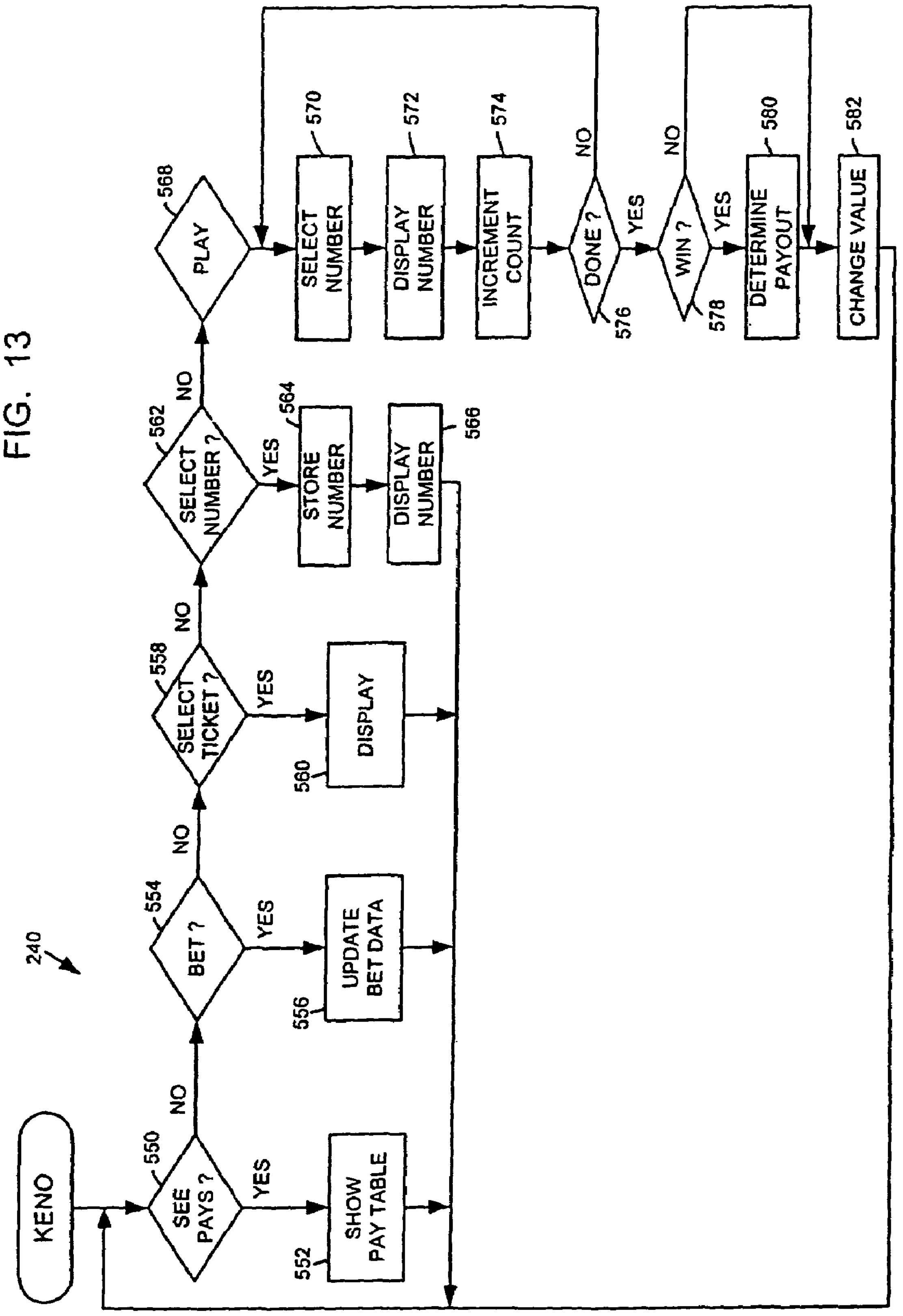
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Figure 14:
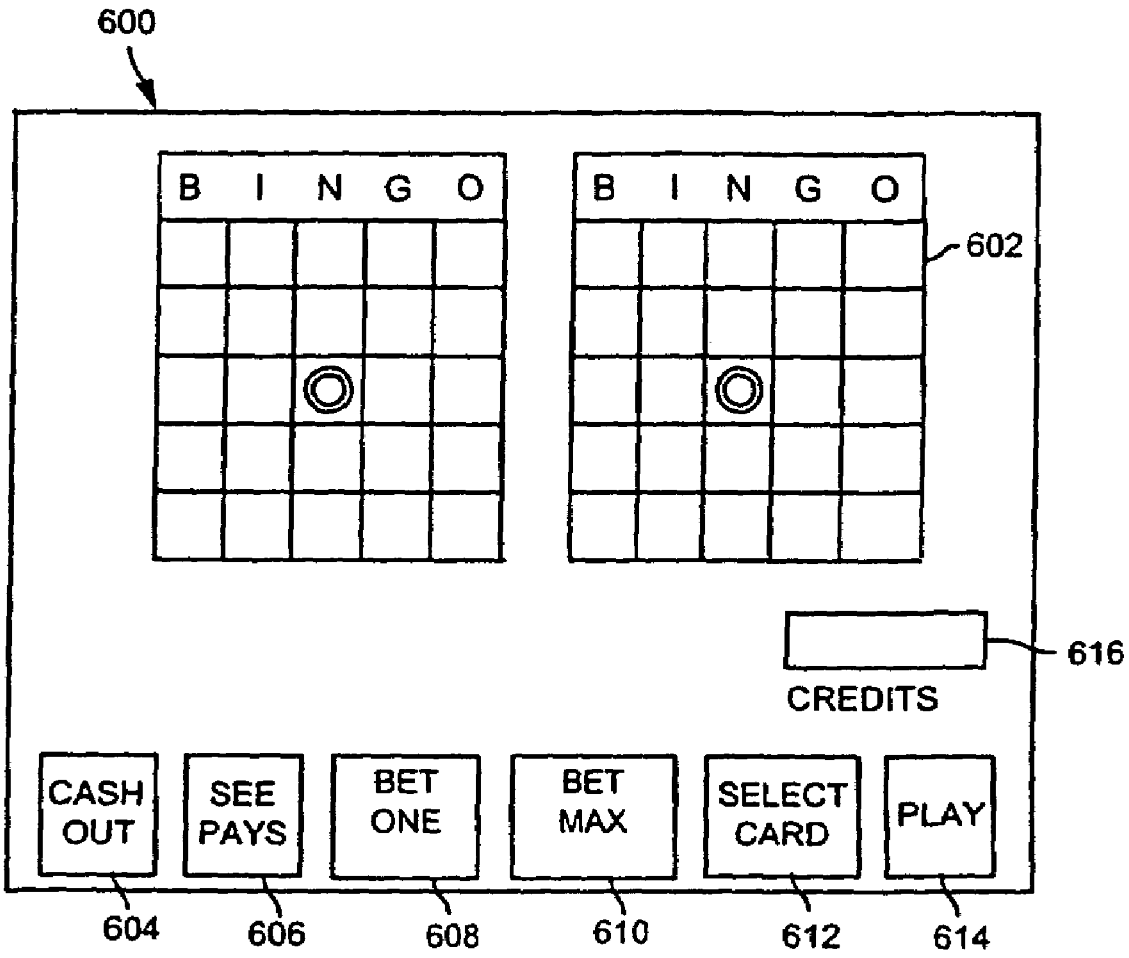
FIG. 14 is an illustration of an embodiment of a visual display that may be displayed during performance of the video bingo routine of FIG. 15.

Video Bingo

Where the gaming unit 20 is designed to facilitate play of a video bingo game, the display unit 70 may comprise a video display unit. FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
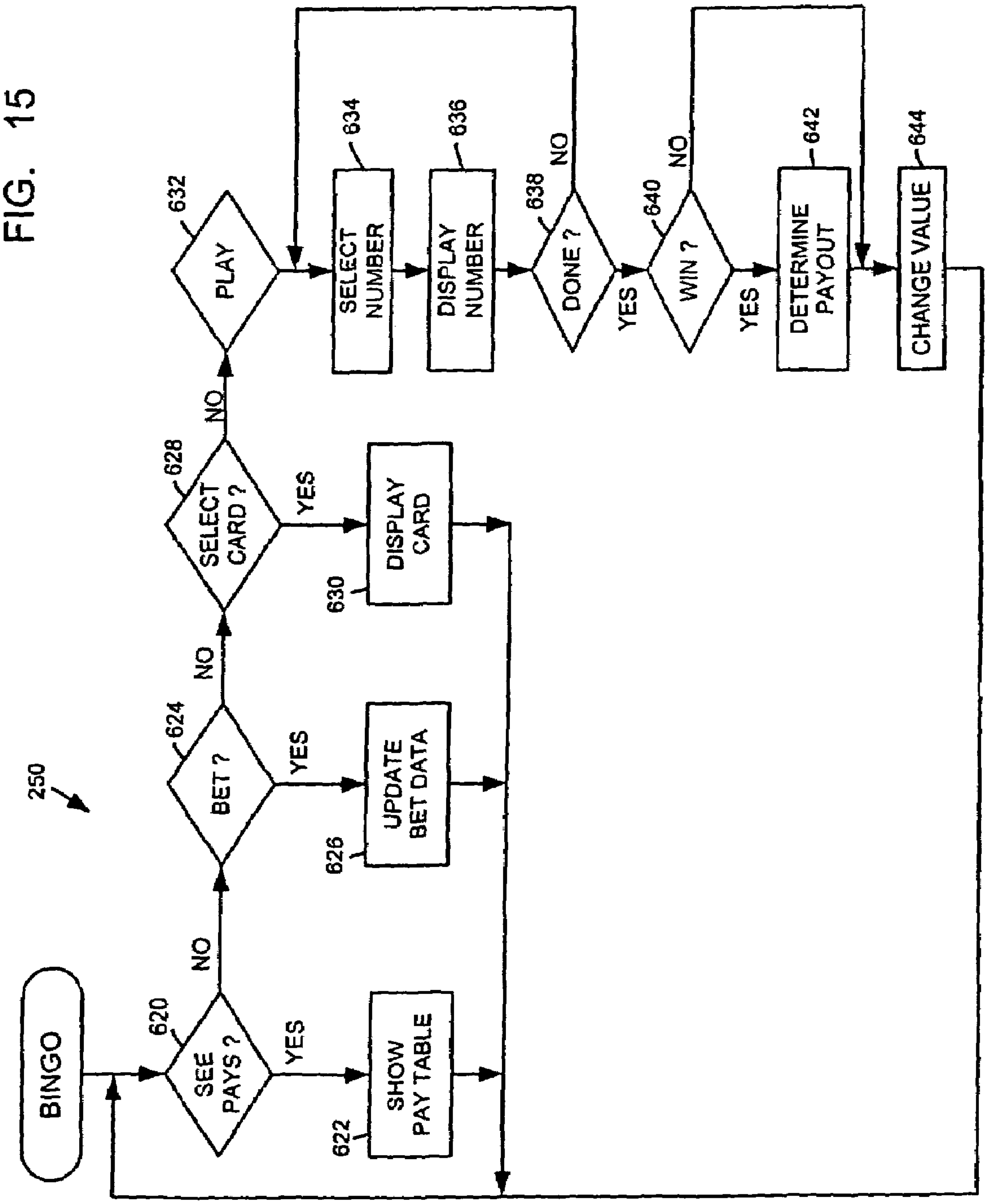
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Light Activation

Figure 16:
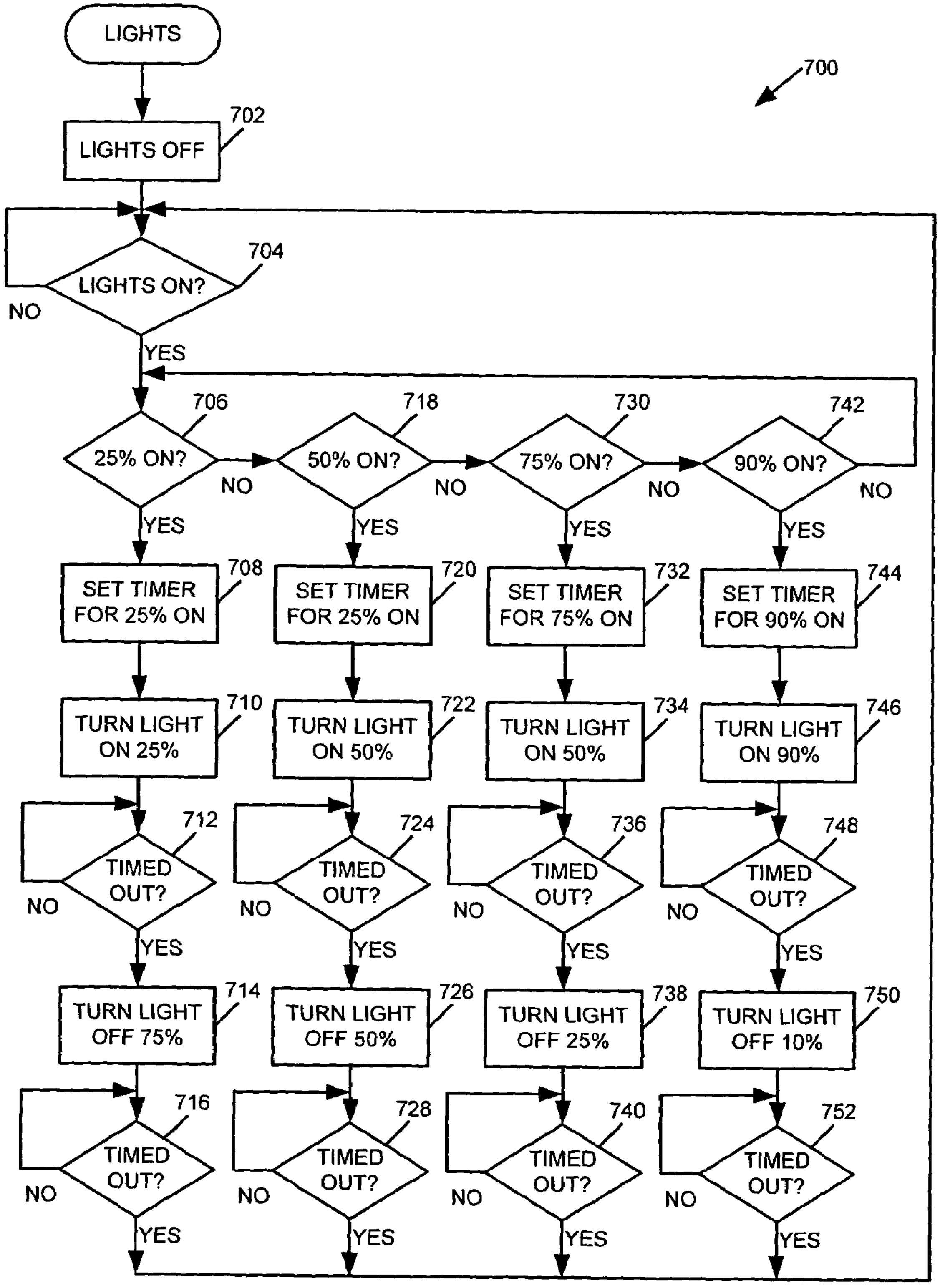
FIG. 16 is a flowchart of an embodiment of a light activation routine that may be performed by one or more of the gaming units.

FIG. 16 is a flowchart of a light activation routine 700 that may be initiated when a player's attention is desired or required on a particular display 69 or display area 69*a*, 69*b*. The light activation routine 700 may also be used as part of the attraction sequence mentioned above to attract a player to the gaming unit 20. Referring to FIG. 16, to begin at a common starting point for all the lights 54, the light activation routine 700 may turn off all the lights 54 or verify that all lights 54 are turned off at block 702.

At block 704, the routine 700 may determine whether an event has occurred that requires the lights 54 to be turned on. If not, the routine 700 may continue to wait until an event occurs. If the occurs, the routine 700 may continue to determine the manner in which the lights 54 will be activated (e.g., flash, rate of flash, etc.). As mentioned above, this event may be triggered in a variety of ways, including the occurrence of a bonus game which requires the player's attention on another display unit 69 or display area 69*a*, 69*b* where an image of the bonus game may be generated. However, the triggering event may be the generation of any display on the display unit 69 or display area 69*a*, 69*b*. For example, the display 69 or display area 69*a*, 69*b* may be blank, turned off, provided with a temporary video graphic (either static or active), etc. until a new image is generated and the player's attention is desired. When an image is to be generated or changed, the controller 100 may cause the panel controller 120 to activate the lights 54. The light activation routine 700 may determine at block 704 if such a triggering event has occurred or if the panel controller 120 has otherwise signaled that the player's attention is desired at a the display unit 69 or display area 69*a*, 69*b*.

At blocks 706, 718, 730, 742, the routine 700 may determine how long the lights are to remain on. This may depend on the multiplexing required, the particular image being displayed, whether this is part of an attraction sequence, or any other number of factors. At block 706, the routine 700 may determine whether the lights 54 are to remain on for 25% of the time. If not, the routine 700 may determine whether the lights 54 are to remain on for 50% of the time at block 718. If not the routine 700 may determine whether the lights are to remain on for 90% of the time. If not, the routine 700 may continue from the beginning to determine the on/off rate. The various rates may be predetermined prior to activating the machine and may be varied by programming the controller 100 or panel controller 120. Alternatively, the routine 700 may be dynamic where the on/off rate is generated as part of the routine 700. The rate choice, whether dynamically determined or predetermined, may be based on the particular triggering event or based on multiplexing requirements.

If the lights are determined to be on for 25% of the time at block 706, a timer may be set to keep the lights on for 25% of a cycle at block 708. The cycle may be predetermined and varied by programming the controller 100 or panel controller 120. Likewise, if the routine 700 determined the on time to be 50% at block 718, the timer may be set for 50% of the cycle at block 720. If the routine 700 determined the on time as 75%, the timer may be set for 75% of the cycle at block 732, and if the routine 700 determined the on time as 90%, the timer may be set for 90% of the cycle at block 744.

Once the timer is set, the lights 54 may be turned on for the chosen amount of time. If set for 25%, the lights 54 may be turned on for 25% of the cycle at block 710; if set for 50%, the lights 54 may be turned on for 50% of the cycle at block 722; if set for 75%, the lights 54 may be turned on for 75% of the cycle at block 734; and if set for 90%, the lights 54 may be turned on for 90% of the cycle at block 746. The routine 700 may periodically determine at blocks 712, 724, 726, 748 whether the timer has timed out. If not, the timer continues. If the timer has timed out, the routine 700 may turn the lights 54 off. If on for 25% of a cycle, the lights 54 may be turned off for the remaining 75% of the cycle at block 714. Likewise, the lights 54 may be turned off for 50% of the cycle at block 726 if the on time was 50%; turned off for 25% of the cycle at block 738 if the on time was 75%; and turned off for 10% of the cycle at block 750 if the on time was 90%.

At blocks 716, 827, 740, 752, the routine 700 may again determine if the timer has timed out (i.e., if the off time is over). If not, the timer continues. If the timer has time out, the routine 700 may loop back to determine if the lights are to remain on or if they are to be turned off (e.g., the player's attention is no longer needed).

What is claimed is:

1. A gaining apparatus, comprising:

a housing comprising a first opening, a second opening, and one or more light sources positioned around said second opening;

a display unit positioned relative to said housing so that a first portion of said display unit is visible through said first opening of said housing and so that a second portion of said display unit is visible through said second opening of said housing;

a value input device;

a controller operatively coupled to said display unit, said value input device and said one or more light sources around said second opening, said controller comprising a processor and a memory operatively coupled to said processor, said controller being programmed to cause said display unit to generate a first display on said first portion of said display unit relating to one of the following games: poker, blackjack, slots, keno or bingo, said controller being programmed to cause said display unit to generate a second display on said second portion of said display unit, said controller being programmed to cause said one or more light sources around said second opening to emit light when said second display is generated on said second portion of said display unit, and said controller being programmed to determine a value payout associated with an outcome of said game;

said housing comprising one or more moveable panels arranged to cover said second portion of said display unit, said controller operatively coupled to said one or more moveable panels, said controller programmed to open said one or more moveable panels to reveal said second portion of said display unit when said second display is generated; and said housing comprising a bezel positioned around said second opening, said bezel comprising said one or more light sources around said second opening, said bezel having a first portion coupled to said housing and a second portion rotatably coupled to said first portion, said controller operatively coupled to said second portion of said bezel, said controller is programmed to cause said second portion of said bezel to rotate relative to said first portion of said bezel when said second display is generated.

2. A gaming apparatus as defined in claim 1, wherein said display unit comprises a video display unit that is capable of generating video images.

3. A gaming apparatus as defined in claim 2, wherein said controller is programmed to cause a video image comprising an image of at least five playing cards to be displayed if said game comprises video poker, wherein said controller is programmed to cause a video image comprising an image of a plurality of simulated slot machine reels to be displayed if said game comprises video slots, wherein said controller is programmed to cause a video image comprising an image of a plurality of playing cards to be displayed if said game comprises video blackjack, wherein said controller is programmed to cause a video image comprising an image of a plurality of keno numbers to be displayed if said game comprises video keno, wherein said controller is programmed to cause a video image comprising an image of a bingo grid to be displayed if said game comprises video bingo.

4. A gaming apparatus as defined in claim 1, wherein said display unit comprises at least one mechanical slot machine reel.

5. A gaming apparatus as defined in claim 1, wherein said controller is programmed to cause said display unit to generate a second display on said second portion of said display unit, said second display relating to one of the following: a bonus game, a payout table, gaming information, game instructions or an attraction sequence.

6. A gaming apparatus as defined in claim 1, wherein said one or more light sources around said second opening comprise one of the following: one or more neon gas lamps, one or more florescent light one or more incandescent lights or one or more light emitting diodes.

7. A gaming apparatus as defined in claim 1, wherein said housing further comprises one or more light sources positioned around said first opening, wherein said controller is programmed to cause said one or more light sources around said first opening to emit light when said first display is generated on said first portion of said display unit.

8. A gaming apparatus as defined in claim 1, wherein said housing comprises a main housing portion and a panel coupled to said main housing portion.

9. A gaming apparatus as defined in claim 8, wherein said panel is removably coupled to said main housing portion.

10. A gaming apparatus as defined in claim 1, wherein a transparent material is disposed over at least one of said openings in said housing.

11. A gaming apparatus as defined in claim 1, wherein said display unit comprises a flat panel display unit.

12. A gaming system comprising a plurality of gaming apparatuses as defined in claim 1, said gaming apparatuses being interconnected to form a network of gaming apparatuses.

13. A gaming system as defined in claim 12, wherein said gaming apparatuses are interconnected via the Internet.

14. A gaming apparatus, comprising:

a housing comprising a first opening, one or more light sources positioned around said first opening, and a second opening;

a first display unit;

a second display unit positioned relative to said housing so that a first portion of said second display unit is visible through said first opening of said housing and so that a second portion of said second display unit is visible through said second opening of said housing;

a value input device;

a controller operatively coupled to said first and second display units, said value input device, and said one or more light sources around said first opening, said controller comprising a processor and a memory operatively coupled to said processor, said controller being programmed to cause said first display unit to generate a first display relating to one of the following games: poker, blackjack, slots, keno or bingo, said controller being programmed to cause said second display unit to generate a second display on said first portion of said second display unit, said controller being programmed to cause said second display unit to generate a third display on said second portion of said second display unit, said controller being programmed to cause one or more light sources round said first opening to emit light when said second display is generated on said first portion of said second display unit, and said controller being programmed to determine a value payout associated with an outcome of said games;

said housing comprising one or more moveable panels arranged to cover said first portion of said second display unit, said controller operatively coupled to said one or more moveable panels, said controller programmed to open said one or more moveable panels to reveal said first portion of said second display unit when said second display is generated; and said housing comprising a bezel positioned around said first opening of said second display unit, said bezel comprising said one or more light sources around said first opening, said bezel having a first portion coupled to said housing and a second portion rotatably coupled to said first portion, said controller operatively coupled to said second portion of said bezel, said controller programmed to cause said second portion of said bezel to rotate relative to said first portion of said bezel when said second display is generated.

15. A gaming apparatus as defined in claim 14, wherein said controller is programmed to cause said second display unit to generate, a second display on said first portion of said second display unit, said second display relating to one of the following: a bonus game, a payout table, gaming information, game instructions or an attraction sequence.

16. A gaming apparatus as defined in claim 14, wherein said one or more light sources around said first opening comprise one of the following: one or more neon gas lamps, one or more florescent light, one or more incandescent tights or one or more light emitting diodes.

17. A gaming apparatus as defined in claim 14, wherein said housing comprises a second opening having one or more light sources positioned around said second opening, wherein said controller is programmed to cause said light sources around said second opening to emit fight when said third display is generated on said second portion of said second display unit.

18. A gaming apparatus as defined in claim 14, wherein said housing comprises a main housing portion and a panel coupled to said main housing portion.

19. A gaming apparatus as defined in claim 18, wherein said panel is removably coupled to said main housing portion.

20. A gaming apparatus as defined in claim 14, wherein a transparent material is disposed over at least one of said openings in said housing.

21. A gaming apparatus as defined in claim 14, wherein at least one of said first and second display units comprises a flat panel display unit.

22. A gaming system comprising a plurality of gaming apparatuses as defined in claim 14, said gaming apparatuses being interconnected to form a network of gaming apparatuses.

23. A gaming apparatus, comprising:

a display unit;

a housing comprising an opening, one or more light sources positioned around said opening, and one or more moveable panels covering said display unit, wherein said housing is positioned so that a portion of said display unit is visible through said opening when said one or more moveable panels are opened;

an value input device;

a controller operatively coupled to said display unit, said value input device, said one or more light sources and said one or more moveable panels, said controller comprising a processor and a memory operatively coupled to said processor, said controller being programmed to cause said display unit to generate a display on said visible portion of said display unit relating to a game, said controller being programmed to cause said one or more moveable panels to open to reveal said visible portion of said display unit when said display is generated, said controller being programmed to cause said one or more light sources to emit light when said display is generated, and said controller being programmed to determine a value payout associated with an outcome of said game;

said housing comprising a bezel positioned around said opening said, bezel comprising said one or more light sources, said bezel having first portion coupled to said housing and a second portion rotatably counted to said first portion, said controller operatively coupled to said second portion of said bezel, said controller programmed to cause said second portion of said bezel to rotate relative to said first portion of said bezel when said display is generated.

24. A gaming apparatus as defined in claim 23, wherein said controller is programmed to cause said display unit to generate a display on said visible portion of said display unit, said display relating to one of the following: a poker game, a blackjack game, a slots game, a keno game, a bingo game, a bonus game, a payout table, gaming information, game instructions or an attraction sequence.

25. A gaming apparatus as defined in claim 23, wherein said one or more light sources comprise one of the following: one or more neon gas lamps, one or more florescent light, one or more incandescent lights or one or more light emitting diodes.

26. A gaming apparatus, comprising:

a housing comprising a first opening, a second opening and one or more light sources positioned around said second opening;

a display unit positioned relative to said housing so that a first portion of said display unit is visible through said first opening of said housing and so that a second portion of said display unit is visible through said second opening of said housing;

a value input device;

a controller operatively coupled to said display unit, said value input device and said one or more light sources positioned around said second opening, said controller comprising a processor and a memory operatively coupled to said processor, said controller being programmed to receive data representing a payline selection made by a player, said controller being programmed to cause said display unit to generate a first game display on said first portion of said display unit, said first game display comprising images of a plurality of slot machine symbols each of which is associated with a respective slot machine reel, said controller being programmed to cause said display unit to generate a second game display on said second portion of said display unit, said controller being programmed to cause said one or more light sources around said second opening to emit light when said second game display is generated one said second portion of said display unit, and said controller being programmed to determine a value payout associated with an outcome of said slots game, said controller being programmed to determine said outcome of said slots game based on a configuration of said slot machine symbols;

said housing comprising one or more moveable panels arranged to cover said second portion of said display unit, said controller operatively coupled to said one or more moveable panels, said controller programmed to open said one or more moveable panels to reveal said second portion of said display unit when said second display is generated;

said housing comprising a bezel positioned around said second opening said bezel comprising said one or more light sources around said second opening said bezel having a first portion coupled to said housing a second portion rotatably coupled to said first portion, said controller o operatively coupled to said second portion of said bezel, said controller programmed to cause said second portion of said bezel to rotate relative to said first portion of said bezel when said second display is generated.

27. A gaming apparatus as defined in claim 26, wherein said display unit comprises a video display unit that is capable of generating video images.

28. A gaming apparatus as defined in claim 27, wherein said controller is programmed to cause a video image comprising an image of a plurality of simulated slot machine reels to be displayed on said display unit.

29. A gaming apparatus as defined in claim 26, wherein said display unit comprises at least one mechanical slot machine reel.

30. A gaming apparatus as defined in claim 26, wherein said controller is programmed to receive payline data representing a number of paylines selected by the player.

31. A gaming apparatus as defined in claim 26, wherein said controller is programmed to cause said display unit to generate a second display on said second portion of said display unit, said second display relating to one of the following: a bonus game, a payout table, gaming information, game instructions or an attraction sequence.

32. A gaming apparatus as defined in claim 26, wherein said one or more light sources around said second opening comprise one of the following: one or more neon gas lamps, one or more florescent light, one or more incandescent lights or one or more light emitting diodes.

33. A gaming apparatus as defined in claim 26, wherein said housing further comprises one or more light sources positioned around said first opening, wherein said controller is programmed to cause said one or more light sources around said first opening to emit light when said first display is generated on said first portion of said display unit.

34. A gaming apparatus as defined in claim 26, wherein said housing comprises a main housing portion and a panel removably coupled to said main housing portion.

35. A gaming apparatus as defined in claim 26, wherein said display unit comprises a flat panel display unit.

36. A gaming system comprising a plurality of gaming apparatuses as defined in claim 26, said gaming apparatuses being interconnected to form a network of gaming apparatuses.

* * * * *